(12) United States Patent
Lee et al.

(10) Patent No.: US 11,328,740 B2
(45) Date of Patent: May 10, 2022

(54) VOICE ONSET DETECTION

(71) Applicant: Magic Leap, Inc., Plantation, FL (US)

(72) Inventors: Jung-Suk Lee, Santa Clara, CA (US); Jean-Marc Jot, Aptos, CA (US)

(73) Assignee: Magic Leap, Inc., Plantation, FL (US)

( * ) Notice: Subject to any disclaimer, the term of this patent is extended or adjusted under 35 U.S.C. 154(b) by 7 days.

(21) Appl. No.: 16/987,267

(22) Filed: Aug. 6, 2020

(65) Prior Publication Data
US 2021/0043223 A1    Feb. 11, 2021

Related U.S. Application Data

(60) Provisional application No. 63/001,118, filed on Mar. 27, 2020, provisional application No. 62/884,143, filed on Aug. 7, 2019.

(51) Int. Cl.
*G10L 25/78* (2013.01)
*G10L 25/51* (2013.01)
(Continued)

(52) U.S. Cl.
CPC .......... *G10L 25/78* (2013.01); *G02B 27/0093* (2013.01); *G02B 27/017* (2013.01);
(Continued)

(58) Field of Classification Search
CPC ......... G10L 25/78; G10L 25/51; G10L 25/84; G10L 21/02; G10L 15/02; G10L 15/32;
(Continued)

(56) References Cited

U.S. PATENT DOCUMENTS 6,496,799 B1   12/2002  Pickering
7,587,319 B2    9/2009  Catchpole
(Continued)

FOREIGN PATENT DOCUMENTS

WO    2014113891 A1    7/2014
WO    2014159581 A1    10/2014
(Continued)

OTHER PUBLICATIONS

Backstrom, T. (Oct. 2015). "Voice Activity Detection Speech Processing," Aalto University, vol. 58, No. 10 Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
(Continued)

*Primary Examiner* — Yogeshkumar Patel
(74) *Attorney, Agent, or Firm* — Morrison & Foerster LLP

(57) ABSTRACT

In some embodiments, a first audio signal is received via a first microphone, and a first probability of voice activity is determined based on the first audio signal. A second audio signal is received via a second microphone, and a second probability of voice activity is determined based on the first and second audio signals. Whether a first threshold of voice activity is met is determined based on the first and second probabilities of voice activity. In accordance with a determination that a first threshold of voice activity is met, it is determined that a voice onset has occurred, and an alert is transmitted to a processor based on the determination that the voice onset has occurred. In accordance with a determination that a first threshold of voice activity is not met, it is not determined that a voice onset has occurred.

20 Claims, 17 Drawing Sheets

(51) Int. Cl.
| | |
|---|---|
| *H04R 3/00* | (2006.01) |
| *H04R 3/04* | (2006.01) |
| *H04R 5/04* | (2006.01) |
| *G06F 3/01* | (2006.01) |
| *G02B 27/00* | (2006.01) |
| *G02B 27/01* | (2006.01) |
| *G06F 17/18* | (2006.01) |

(52) U.S. Cl.
CPC ............ *G06F 3/011* (2013.01); *G06F 3/017* (2013.01); *G06F 17/18* (2013.01); *G10L 25/51* (2013.01); *H04R 3/005* (2013.01); *H04R 3/04* (2013.01); *H04R 5/04* (2013.01); *G10L 2025/783* (2013.01)

(58) Field of Classification Search
CPC ........ G10L 2025/783; G10L 2025/786; H04R 1/406; H04R 1/028; H04R 3/005; H04R 3/04; H04R 5/04; H04R 2201/023; G02B 27/0093; G02B 27/017; G02B 27/0172; G02B 2027/0123; G06F 3/011; G06F 3/012; G06F 3/013; G06F 3/017; G06F 17/18; G06F 3/0304; G06F 3/0346; G06F 3/167; A61B 5/6803; A61B 5/01; A61B 5/6815; A61B 5/6816; A61B 5/7465
See application file for complete search history.

(56) References Cited

U.S. PATENT DOCUMENTS

| | | | |
|---|---|---|---|
| 7,979,277 B2 | 7/2011 | Larri et al. | |
| 8,154,588 B2 | 4/2012 | Burns | |
| 10,062,377 B2 | 8/2018 | Larri et al. | |
| 10,839,789 B2 | 11/2020 | Larri et al. | |
| 10,971,140 B2 | 4/2021 | Catchpole | |
| 2005/0069852 A1 | 3/2005 | Janakiraman et al. | |
| 2007/0225982 A1 | 9/2007 | Washio | |
| 2010/0323652 A1* | 12/2010 | Visser | H04R 3/005 455/232.1 |
| 2011/0238407 A1 | 9/2011 | Kent | |
| 2011/0288860 A1* | 11/2011 | Schevciw | G10L 25/78 704/E15.039 |
| 2012/0130713 A1* | 5/2012 | Shin | G10L 25/78 704/E15.001 |
| 2012/0209601 A1 | 8/2012 | Jing | |
| 2013/0204607 A1 | 8/2013 | Baker, IV | |
| 2014/0194702 A1* | 7/2014 | Tran | A61B 8/565 600/595 |
| 2014/0270202 A1 | 9/2014 | Ivanov et al. | |
| 2014/0379336 A1 | 12/2014 | Bhatnagar | |
| 2016/0216130 A1 | 7/2016 | Abramson et al. | |
| 2016/0217781 A1 | 7/2016 | Zhong et al. | |
| 2016/0379629 A1 | 12/2016 | Hofer et al. | |
| 2016/0379632 A1 | 12/2016 | Hoffmeister et al. | |
| 2016/0379638 A1 | 12/2016 | Basye et al. | |
| 2017/0091169 A1 | 3/2017 | Bellegarda | |
| 2017/0110116 A1 | 4/2017 | Tadpatrikar et al. | |
| 2017/0148429 A1 | 5/2017 | Hayakawa | |
| 2017/0270919 A1 | 9/2017 | Parthasarathi et al. | |
| 2017/0316780 A1 | 11/2017 | Lovitt | |
| 2018/0077095 A1 | 3/2018 | Deyle et al. | |
| 2018/0129469 A1* | 5/2018 | Vennström et al. | G06F 3/017 |
| 2018/0358021 A1 | 12/2018 | Mistica et al. | |
| 2018/0366114 A1 | 12/2018 | Anbazhagan et al. | |
| 2019/0362741 A1 | 11/2019 | Li et al. | |
| 2020/0027455 A1 | 1/2020 | Sugiyama et al. | |
| 2020/0064921 A1 | 2/2020 | Kang et al. | |
| 2020/0279561 A1 | 9/2020 | Sheeder et al. | |
| 2020/0286465 A1* | 9/2020 | Wang | G10L 15/083 |
| 2020/0335128 A1 | 10/2020 | Sheeder et al. | |
| 2021/0043223 A1 | 2/2021 | Lee et al. | |
| 2021/0056966 A1 | 2/2021 | Bilac et al. | |
| 2021/0264931 A1 | 8/2021 | Leider | |
| 2021/0306751 A1 | 9/2021 | Roach et al. | |

FOREIGN PATENT DOCUMENTS

| | | |
|---|---|---|
| WO | 2015169618 A1 | 11/2015 |
| WO | 2016153712 A1 | 9/2016 |
| WO | 2017017591 A1 | 2/2017 |
| WO | 2020180719 A1 | 9/2020 |
| WO | 2020214844 A1 | 10/2020 |

OTHER PUBLICATIONS

Bilac, M. et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, 13 pages.

Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf, 22 pages.

International Preliminary Report and Patentability dated Dec. 22, 2020, for PCT Application No. PCT/US2019/038546, 13 pages.

International Search Report and Written Opinion dated Jul. 2, 2020, for PCT Application No. PCT/US2020/028570, filed Apr. 16, 2020, nineteen pages.

International Search Report and Written Opinion dated May 18, 2020, for PCT Application No. PCT/US20/20469, filed Feb. 28, 2020, twenty pages.

International Search Report and Written Opinion dated Sep. 17, 2019, for PCT Application No. PCT/US2019/038546, sixteen pages.

Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download? doi=10.1.1.141.1472 &rep=rep1&type=pdf entire document, pp. 1237-1240.

Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/akgroup/ak_pub/abschlussarbeiten/2015/ToengesRaffael_MasA.pdf 100 pages.

Non-Final Office Action dated Jun. 24, 2021, for U.S. Appl. No. 16/805,337, filed Feb. 28, 2020, fourteen pages.

International Preliminary Report and Written Opinion dated Sep. 16, 2021, for PCT Application No. PCT/US20/20469, filed Feb. 28, 2020, nine pages.

Non-Final Office Action dated Oct. 4, 2021, for U.S. Appl. No. 16/850,965, filed Apr. 16, 2020, twelve pages.

European Search Report dated Nov. 12, 2021, for EP Application No. 19822754.8, ten pages.

Final Office Action dated Oct. 6, 2021, for U.S. Appl. No. 16/805,337, filed Feb. 28, 2020, fourteen pages.

International Preliminary Report and Written Opinion dated Oct. 28, 2021, for PCT Application No. PCT/US2020/028570, filed Apr. 16, 2020, 17 pages.

International Search Report and Written Opinion dated Jan. 24, 2022, for PCT Application No. PCT/US2021/53046, filed Sep. 20, 2021, 15 pages.

\* cited by examiner

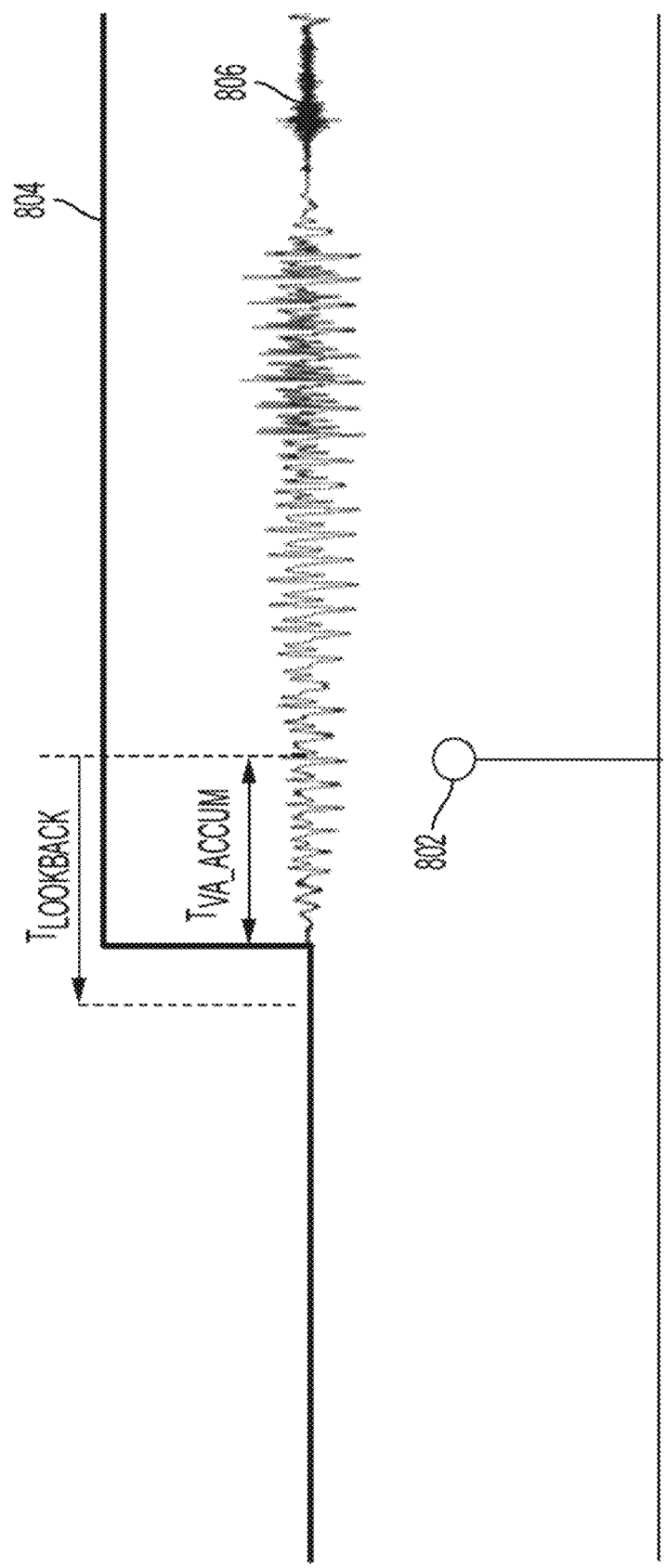

VOICE ONSET DETECTION

RELATED APPLICATIONS

This patent application claims priority to U.S. Provisional Patent Application No. 62/884,143 filed on Aug. 7, 2019 and U.S. Provisional Patent Application No. 63/001,118 filed Mar. 27, 2020, which are hereby incorporated reference in their entirety.

FIELD

This disclosure relates in general to systems and methods for processing speech signals, and in particular to systems and methods for processing a speech signal to determine the onset of voice activity.

BACKGROUND

Systems for speech recognition are tasked with receiving audio input representing human speech, typically via one or more microphones, and processing the audio input to determine words, logical structures, or other outputs corresponding to that audio input. For example, automatic speech recognition (ASR) systems may generate a text output based on the human speech corresponding to an audio input signal; and natural language processing (NLP) tools may generate logical structures, or computer data, corresponding to the meaning of that human speech. While such systems may contain any number of components, at the heart of such systems is a speech processing engine, which is a component that accepts an audio signal as input, performs some recognition logic on the input, and outputs some text corresponding to that input.

Historically, audio input was provided to speech processing engines in a structured, predictable manner. For example, a user might speak directly into a microphone of a desktop computer in response to a first prompt (e.g., "Begin Speaking Now"); immediately after pressing a first button input (e.g., a "start" or "record" button, or a microphone icon in a software interface); or after a significant period of silence. Similarly, a user might stop providing microphone input in response to a second prompt (e.g., "Stop Speaking"); immediately before pressing a second button input (e.g., a "stop" or "pause" button); or by remaining silent for a period of time. Such structured input sequences left little doubt as to when the user was providing input to a speech processing engine (e.g., between a first prompt and a second prompt, or between pressing a start button and pressing a stop button). Moreover, because such systems typically required deliberate action on the part of the user, it could generally be assumed that a user's speech input was directed to the speech processing engine, and not to some other listener (e.g., a person in an adjacent room). Accordingly, many speech processing engines of the time may not have had any particular need to identify, from microphone input, which portions of the input were directed to the speech processing engine and were intended to provide speech recognition input, and conversely, which portions were not.

The ways in which users provide speech recognition input has changed as speech processing engines have become more pervasive and more fully integrated into users' everyday lives. For example, some automated voice assistants are now housed in or otherwise integrated with household appliances, automotive dashboards, smart phones, wearable devices, "living room" devices (e.g., devices with integrated "smart" voice assistants), and other environments far removed from the conventional desktop computer. In many cases, speech processing engines are made more broadly usable by this level of integration into everyday life. However, these systems would be made cumbersome by system prompts, button inputs, and other conventional mechanisms for demarcating microphone input to the speech processing engine. Instead, some such systems place one or more microphones in an "always on" state, in which the microphones listen for a "wake-up word" (e.g., the "name" of the device or any other predetermined word or phrase) that denotes the beginning of a speech recognition input sequence. Upon detecting the wake-up word, the speech processing engine can process the following sequence of microphone input as input to the speech processing engine.

While the wake-up word system replaces the need for discrete prompts or button inputs for speech processing engines, it can be desirable to minimize the amount of time the wake-up word system is required to be active. For example, mobile devices operating on battery power benefit from both power efficiency and the ability to invoke a speech processing engine (e.g., invoking a smart voice assistant via a wake-up word). For mobile devices, constantly running the wake-up word system to detect the wake-up word may undesirably reduce the device's power efficiency. Ambient noises or speech other than the wake-up word may be continually processed and transcribed, thereby continually consuming power. However, processing and transcribing ambient noises or speech other than the wake-up word may not justify the required power consumption. It therefore can be desirable to minimize the amount of time the wake-up word system is required to be active without compromising the device's ability to invoke a speech processing engine.

In addition to reducing power consumption, it is also desirable to improve the accuracy of speech recognition systems. For example, a user who wishes to invoke a smart voice assistant may become frustrated if the smart voice assistant does not accurately respond to the wake-up word. The smart voice assistant may respond to an acoustic event that is not the wake-up word (i.e., false positives), the assistant may fail to respond to the wake-up word (i.e., false negatives), or the assistant may respond too slowly to the wake-up word (i.e., lag). Inaccurate responses to the wake-up word like the above examples may frustrate the user, leading to a degraded user experience. The user may further lose trust in the reliability of the product's speech processing engine interface. It therefore can be desirable to develop a speech recognition system that accurately responds to user input.

BRIEF SUMMARY

Examples of the disclosure describe systems and methods for determining a voice onset. According to an example method, a first audio signal is received via a first microphone, and a first probability of voice activity is determined based on the first audio signal. A second audio signal is received via a second microphone, and a second probability of voice activity is determined based on the first and second audio signals. Whether a first threshold of voice activity is met is determined based on the first and second probabilities of voice activity. In accordance with a determination that a first threshold of voice activity is met, it is determined that a voice onset has occurred and an alert is transmitted to a processor based on the determination that the voice onset has occurred. In accordance with a determination that a first threshold of voice activity is not met, it is not determined that a voice onset has occurred.

BRIEF DESCRIPTION OF THE DRAWINGS

FIG. 8 illustrates an example of determining an onset of voice activity according to some embodiments of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
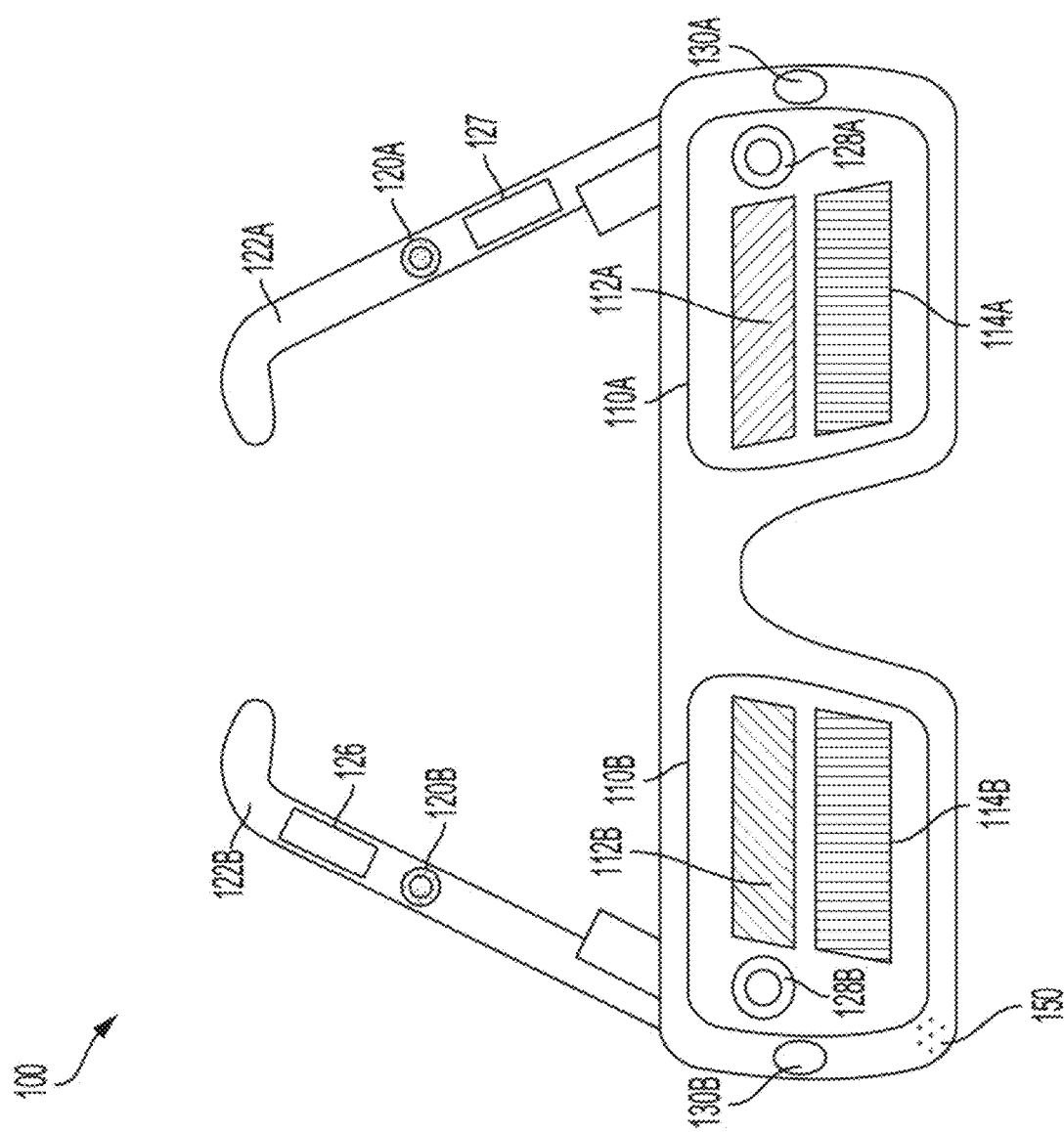
FIG. 1 illustrates an example wearable system according to some embodiments of the disclosure.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMUs, e.g. IMU 126), acoustic sensors (e.g., microphones 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128A and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
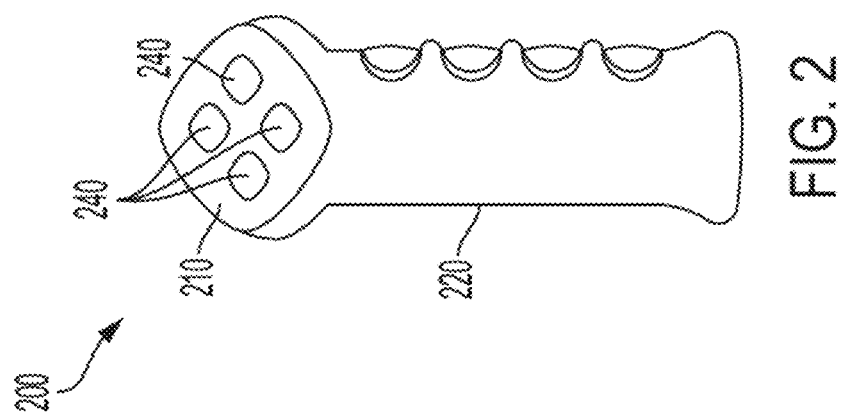
FIG. 2 illustrates an example handheld controller according to some embodiments of the disclosure.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
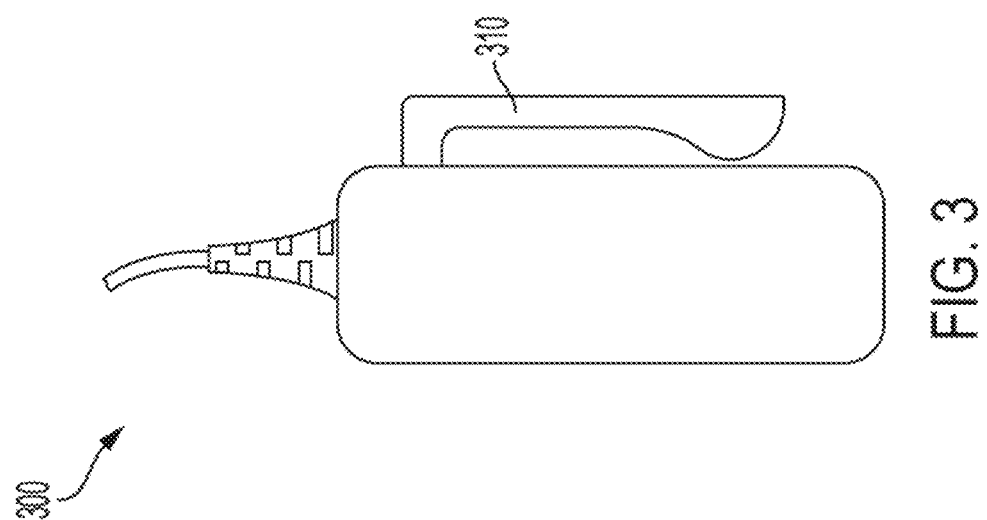
FIG. 3 illustrates an example auxiliary unit according to some embodiments of the disclosure.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
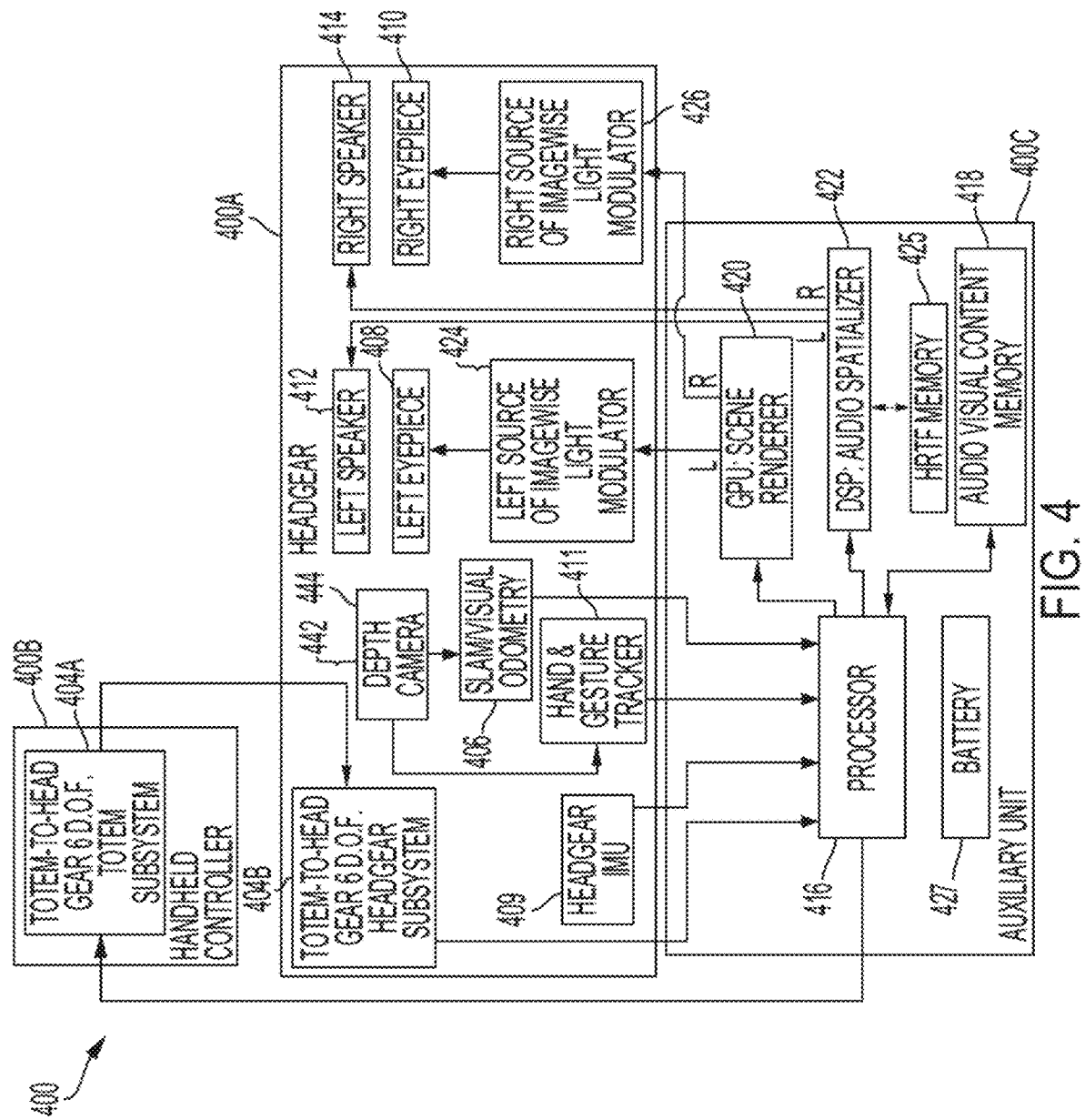
FIG. 4 illustrates an example functional block diagram for an example wearable system according to some embodiments of the disclosure.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6 DOF) totem subsystem 404A. Wearable system 400 can also include example headgear device 400A (which may correspond to wearable head device 100 described above); the headgear device 400A includes a totem-to-headgear 6 DOF headgear subsystem 404B. In the example, the 6 DOF totem subsystem 404A and the 6 DOF headgear subsystem 404B cooperate to determine six coordinates (e.g., offsets in three translation directions and rotation along three axes) of the handheld controller 400B relative to the headgear device 400A. The six degrees of freedom may be expressed relative to a coordinate system of the headgear device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the headgear device 400A; and/or one or more optical targets (e.g., buttons 240 of handheld controller 200 as described above, or dedicated optical targets included in the handheld controller) can be used for 6 DOF tracking. In some examples, the handheld controller 400B can include a camera, as described above; and the headgear device 400A can include an optical target for optical tracking in conjunction with the camera. In some examples, the headgear device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6 DOF of the handheld controller 400B relative to the headgear device 400A may be determined. In some examples, 6 DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to headgear device 400A) to an inertial coordinate space, or to an environmental coordinate space. For instance, such transformations may be necessary for a display of headgear device 400A to present a virtual object at an expected position and orientation relative to the real environment (e.g., a virtual person sitting in a real chair, facing forward, regardless of the position and orientation of headgear device 400A), rather than at a fixed position and orientation on the display (e.g., at the same position in the display of headgear device 400A). This can maintain an illusion that the virtual object exists in the real environment (and does not, for example, appear positioned unnaturally in the real environment as the headgear device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the headgear device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of headgear device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of headgear device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, microphones 450; and/or the hand gesture tracker 411. The processor 416 can also send and receive control signals from the 6 DOF totem system 404A. The processor 416 may be coupled to the 6 DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to headgear device 400A and/or handheld controller 400B. Including such components in an auxiliary unit, which can be mounted to a user's waist, can limit the size and weight of headgear device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Speech Processing Engines

Speech recognition systems in general include a speech processing engine that can accept an input audio signal corresponding to human speech (a source signal); process and analyze the input audio signal; and produce, as a result of the analysis, an output corresponding to the human speech. In the case of automatic speech recognition (ASR) systems, for example, the output of a speech processing engine may be a text transcription of the human speech. In the case of natural language processing systems, the output may be one or more commands or instructions indicated by the human speech; or some representation (e.g., a logical expression or a data structure) of the semantic meaning of the human speech. While reference is made herein to speech processing engines, other forms of speech processing besides speech recognition should also be considered within the scope of the disclosure. Other types of speech processing systems (e.g., automatic translation systems), including those that do not necessarily "recognize" speech, are contemplated and are within the scope of the disclosure.

Speech recognition systems are found in a diverse array of products and applications: conventional telephone systems; automated voice messaging systems; voice assistants (including standalone and smartphone-based voice assistants); vehicles and aircraft; desktop and document processing software; data entry; home appliances; medical devices; language translation software; closed captioning systems; and others. An advantage of speech recognition systems is that they may allow users to provide input to a computer system using natural spoken language, such as presented to one or more microphones, instead of conventional computer input devices such as keyboards or touch panels; accordingly, speech recognition systems may be particularly useful in environments where conventional input devices (e.g., keyboards) may be unavailable or impractical. Further, by permitting users to provide intuitive voice-based input, speech processing engines can heighten feelings of immersion. As such, speech recognition can be a natural fit for wearable systems, and in particular, for virtual reality, augmented reality, and/or mixed reality applications of wearable systems, in which user immersion is a primary goal; and in which it may be desirable to limit the use of conventional computer input devices, whose presence may detract from feelings of immersion.

Although speech processing engines allow users to naturally interface with a computer system through spoken language, constantly running the speech processing engine can pose problems. For example, one problem is that the user experience may be degraded if the speech processing engine responds to noise, or other sounds, that are not intended to be speech input. Background speech can be particularly problematic, as it could cause the computer system to execute unintended commands if the speech processing engine hears and interprets the speech. Because it can be difficult, if not impossible, to eliminate the presence of background speech in a user's environment (particularly for mobile devices), speech processing engines can benefit from a system that can ensure that the speech processing engine only responds to audio signals intended to be speech input for the computer system.

Such a system can also alleviate a second problem of continually running the speech processing engine: power efficiency. A continually running speech processing engine requires power to process a continuous stream of audio signals. Because automatic speech recognition and natural language processing can be computationally expensive tasks, the speech processing engine can be power hungry. Power constraints can be particularly acute for battery powered mobile devices, as continually running the speech processing engine can undesirably reduce the operating time of the mobile device. One way a system can alleviate this problem is by activating the speech processing engine only when the system has determined there is a high likelihood that the audio signal is intended as input for the speech processing engine and the computer system. By initially screening the incoming audio signal to determine if it is likely to be intended speech input, the system can ensure that the speech recognition system accurately responds to speech input while disregarding non-speech input. The system may also increase the power efficiency of the speech recognition system by reducing the amount of time the speech processing engine is required to be active.

One part of such a system can be a wake-up word system. A wake-up word system can rely upon a specific word or phrase to be at the beginning of any intended speech input. The wake-up word system can therefore require that the user first say the specific wake-up word or phrase and then follow the wake-up word or phrase with the intended speech input. Once the wake-up word system detects that the wake-up word has been spoken, the associated audio signal (that may or may not include the wake-up word) can be processed by the speech processing engine or passed to the computer system. Wake-up word systems with a well-selected wake-up word or phrase can reduce or eliminate unintended commands to the computer system from audio signals that are not intended as speech input. If the wake-up word or phrase is not typically uttered during normal conversation, the wake-up word or phrase may serve as a reliable marker that indicates the beginning of intended speech input. However, a wake-up word system still requires a speech processing engine to actively process audio signals to determine if any given audio signal includes the wake-up word.

It therefore can be desirable to create an efficient system that first determines if an audio signal is likely to be a wake-up word. In some embodiments, the system can first determine that an audio signal is likely to include a wake-up word. The system can then wake the speech processing engine and pass the audio signal to the speech processing engine. In some embodiments, the system comprises a voice activity detection system and further comprises a voice onset detection system.

The present disclosure is directed to systems and methods for improving the accuracy and power efficiency of a speech recognition system by filtering out audio signals that are not likely to be intended speech input. As described herein, such audio signals can first be identified (e.g., classified) by a voice activity detection system (e.g., as voice activity or non-voice activity). A voice onset detection system can then determine that an onset has occurred (e.g., of a voice activity event). The determination of an onset can then trigger subsequent events (e.g., activating a speech processing engine to determine if a wake-up word was spoken). "Gate-keeping" audio signals that the speech processing engine is required to process allows the speech processing engine to remain inactive when non-input audio signals are received. In some embodiments, the voice activity detection system and the voice onset detection system are configured to run on a low power, always-on processor.

Such capabilities may be especially important in mobile applications of speech processing, even more particularly for wearable applications, such as virtual reality or augmented reality applications. In such wearable applications, the user may often speak without directing input speech to the wearable system. The user may also be in locations where significant amounts of background speech exists. Further, the wearable system may be battery-operated and have a limited operation time. Sensors of wearable systems (such as those described in this disclosure) are well suited to solving this problem, as described herein. However, it is also contemplated that systems and methods described herein can also be applied in non-mobile applications (e.g., a voice assistant running on a device connected to a power outlet or a voice assistant in a vehicle).

Voice Activity Detection

Figure 5:
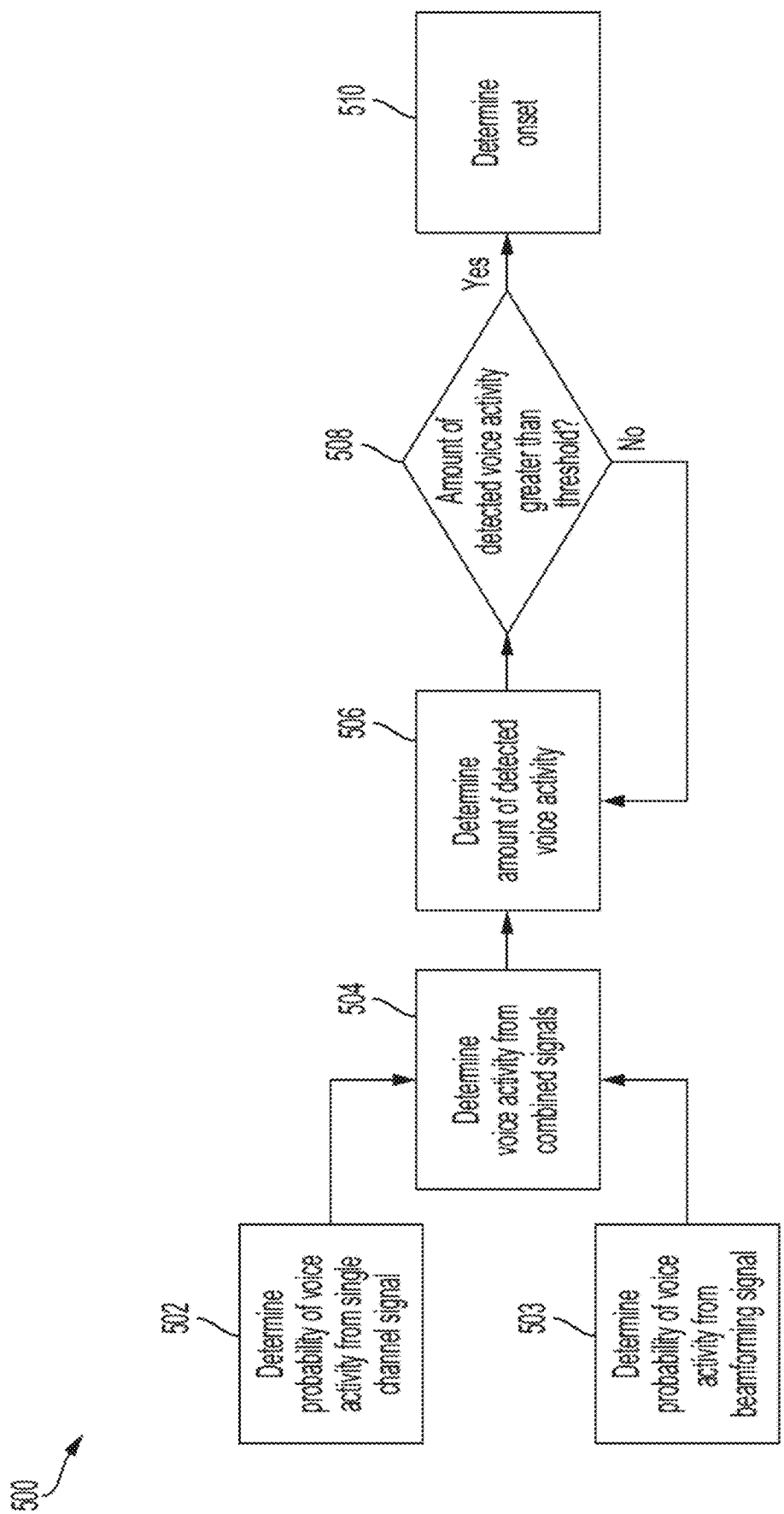
FIG. 5 illustrates an example flow chart for determining an onset of voice activity according to some embodiments of the disclosure.

FIG. 5 illustrates an example system 500, according to some embodiments, in which one or more audio signals are classified as either voice activity or non-voice activity. In the depicted embodiment, voice activity detection is determined from both a single channel signal step 502 and from a beamforming signal step 503. At step 504, the single channel signal and the beamforming signal are combined to determine voice activity from the one or more audio signals. However, it is also contemplated that, in some cases, one of a single-channel audio signal or a beamforming audio signal can be used to determine voice activity detection. At step 506, the amount of voice activity is measured over a length of time (e.g., a predetermined period of time or a dynamic period of time). At step 508, if the amount of measured voice activity is less than a threshold (e.g., a predetermined period of time, a dynamic period of time), the system returns to step 506 and continues to measure the amount of voice activity over a length of time. If the amount of measured voice activity is greater than a threshold, the system will determine an onset at step 510.

Figure 6A:
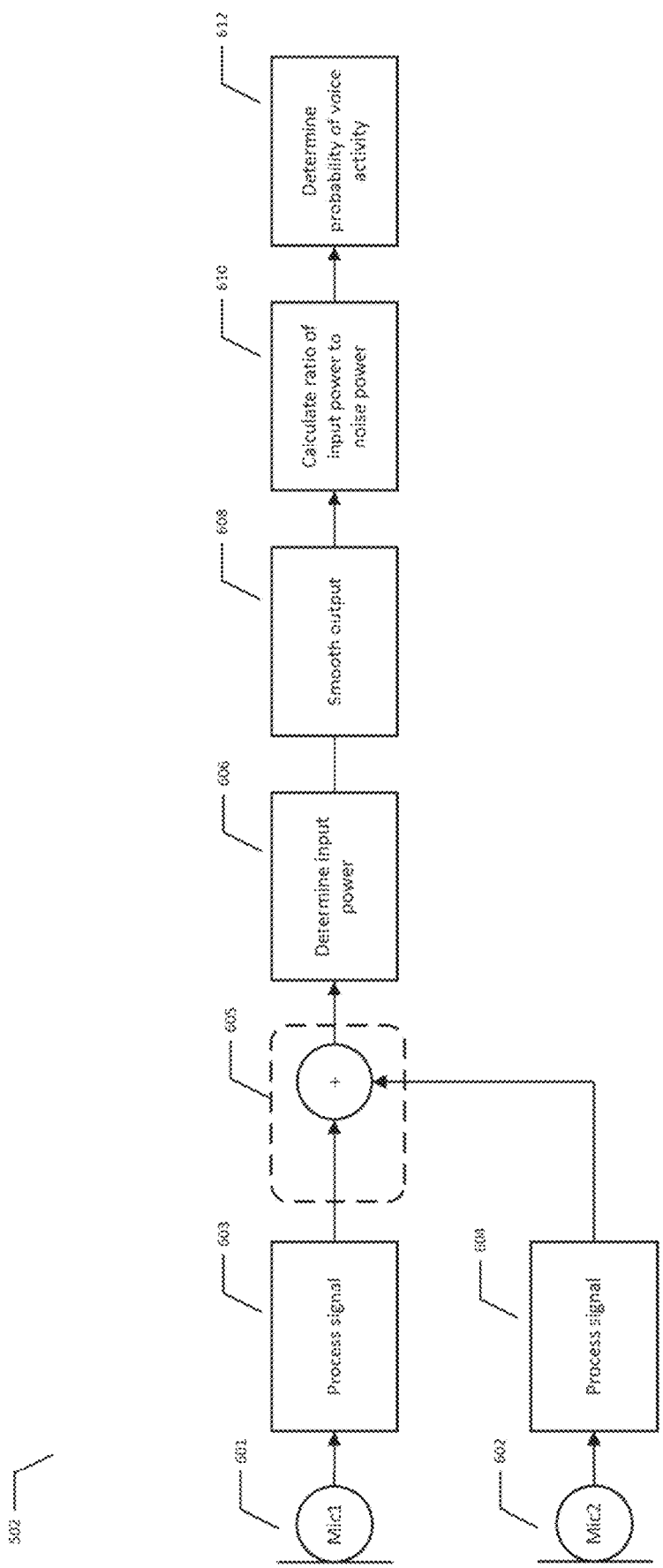
FIGS. 6A-6C illustrate examples of processing input audio signals according to some embodiments of the disclosure.

FIG. 6A illustrates in more detail an example of how determining a probability of voice activity from a single channel signal step 502 can be performed. In the depicted embodiment, input audio signals from microphones 601 and 602 (e.g., microphones 150) can be processed at steps 603 and 604. Microphones 601 and 602 can be placed in a broadside configuration with respect to a user's mouth. Microphones 601 and 602 can also be placed equidistant from a user's mouth for ease of subsequent signal processing. However, it is also contemplated that other microphone arrangements (e.g., number of microphones, placement of microphones, asymmetric microphone arrangements) can be used. However, in other embodiments, input audio signals can be provided from other suitable sources as well (e.g., a data file or a network audio stream). In some embodiments, signal processing steps 603 and 604 include applying a window function to the audio signal. A window function can be zero-valued outside of a chosen interval, and it can be useful to use window functions when the information carrying portion of a signal is in a known range (e.g., human speech). A window function can also serve to deconstruct a signal into frames that approximate a signal from a stationary process. It can be beneficial to approximate a signal from a stationary process to apply signal processing techniques suited for stationary processes (e.g., a Fourier transform). In some embodiments, a Hann window can be used, with a frame overlapping percentage of 50%. However, it is contemplated that other window functions with different frame overlapping percentages and/or hop sizes can be used. In some embodiments, the audio signal can also be filtered at steps 603 and 604. Filtering can occur inside or outside the frequency domain to suppress parts of a signal that do not carry information (e.g., parts of a signal that do not carry human speech). In some embodiments, a bandpass filter can be applied to reduce noise in non-voice frequency bands. In some embodiments, a finite impulse response filter (FIR) can be used to preserve the phase of the signal. In some embodiments, both a window function and a filter are applied to an audio signal at steps 603 and 604. In some embodiments, a window function can be applied before a filter function is applied to an audio signal. However, it is also contemplated that one of a window function or a filter are applied to the audio signal at one of step 603 or step 604, or other signal processing steps are applied at one of step 603 or step 604.

In some embodiments, input audio signals can be summed together at step 605. For microphone configurations that are symmetric relative to a signal source (e.g., a user's mouth), a summed input signal can serve to reinforce an information signal (e.g., a speech signal) because the information signal can be present in both individual input signals, and each microphone can receive the information signal at the same time. In some embodiments, the noise signal in the individual input audio signals can generally not be reinforced because of the random nature of the noise signal. For microphone configurations that are not symmetric relative to a signal source, a summed signal can serve to increase a signal-to-noise ratio (e.g., by reinforcing a speech signal without reinforcing a noise signal). In some embodiments, a filter or delay process can be used for asymmetric microphone configurations. A filter or delay process can align input audio signals to simulate a symmetric microphone configuration by compensating for a longer or shorter path from a signal source to a microphone. Although the depicted embodiment illustrates two input audio signals summed together, it is also contemplated that a single input audio signal can be used, or more than two input audio signals can be summed together as well. It is also contemplated that signal processing steps 603 and/or 604 can occur after a summation step 605 on a summed input signal.

In some embodiments, input power can be estimated at step 606. In some embodiments, input power can be determined on a per-frame basis based on a windowing function applied at steps 603 and 604. At step 608, the audio signal can optionally be smoothed to produce a smoothed input power. In some embodiments, the smoothing process occurs over the frames provided by the windowing function. Although the depicted embodiment shows signal processing and smoothing steps 603, 604, and 608, it is also contemplated that the input audio signal can be processed at step 610.

At step 610, a ratio of the smoothed input power to the noise power estimate is calculated. In some embodiments, the noise power estimate is used to determine voice activity, however, the noise power estimate may also (in some embodiments) rely on information as to when speech is present or absent. Because of the interdependence between inputs and outputs, methods like minima controlled recursive averaging (MCRA) can be used to determine the noise power estimate (although other methods may be used).

Figure 6B:
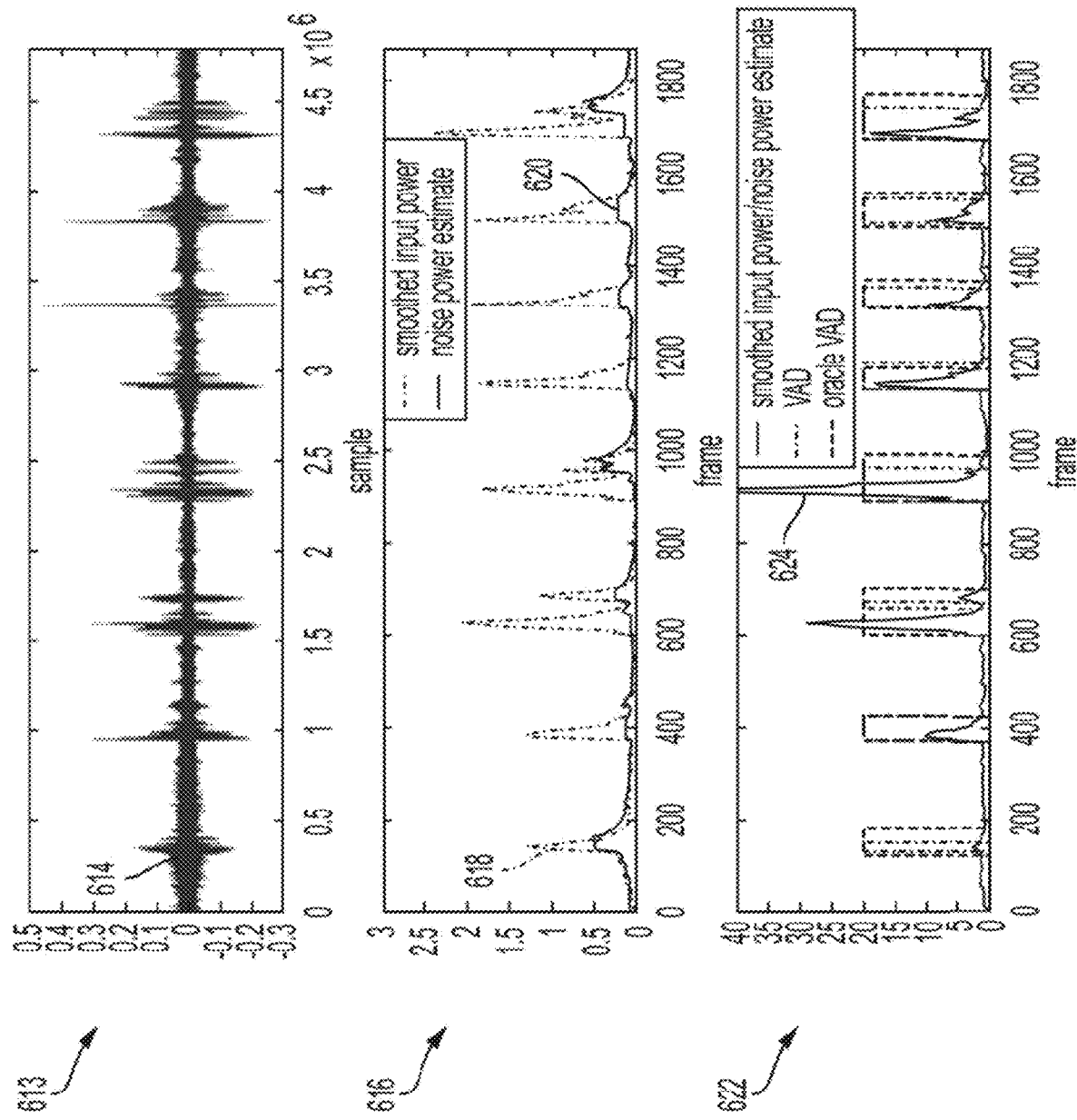

FIG. 6B illustrates an example processing of an input signal to calculate the ratio of smoothed input power to the noise power estimate. In graph 613, a signal 614 is displayed that includes both an information signal (e.g., human speech) and noise (e.g., any signal that is not human speech). In graph 616, the noise power is estimated and displayed as signal 620 and the smoothed input power—which can be a result of processing signal 614—can be displayed as signal 618. In graph 622, the ratio of the smoothed input power signal 618 and the noise power estimate signal 620 is displayed as signal 624.

Figure 6C:
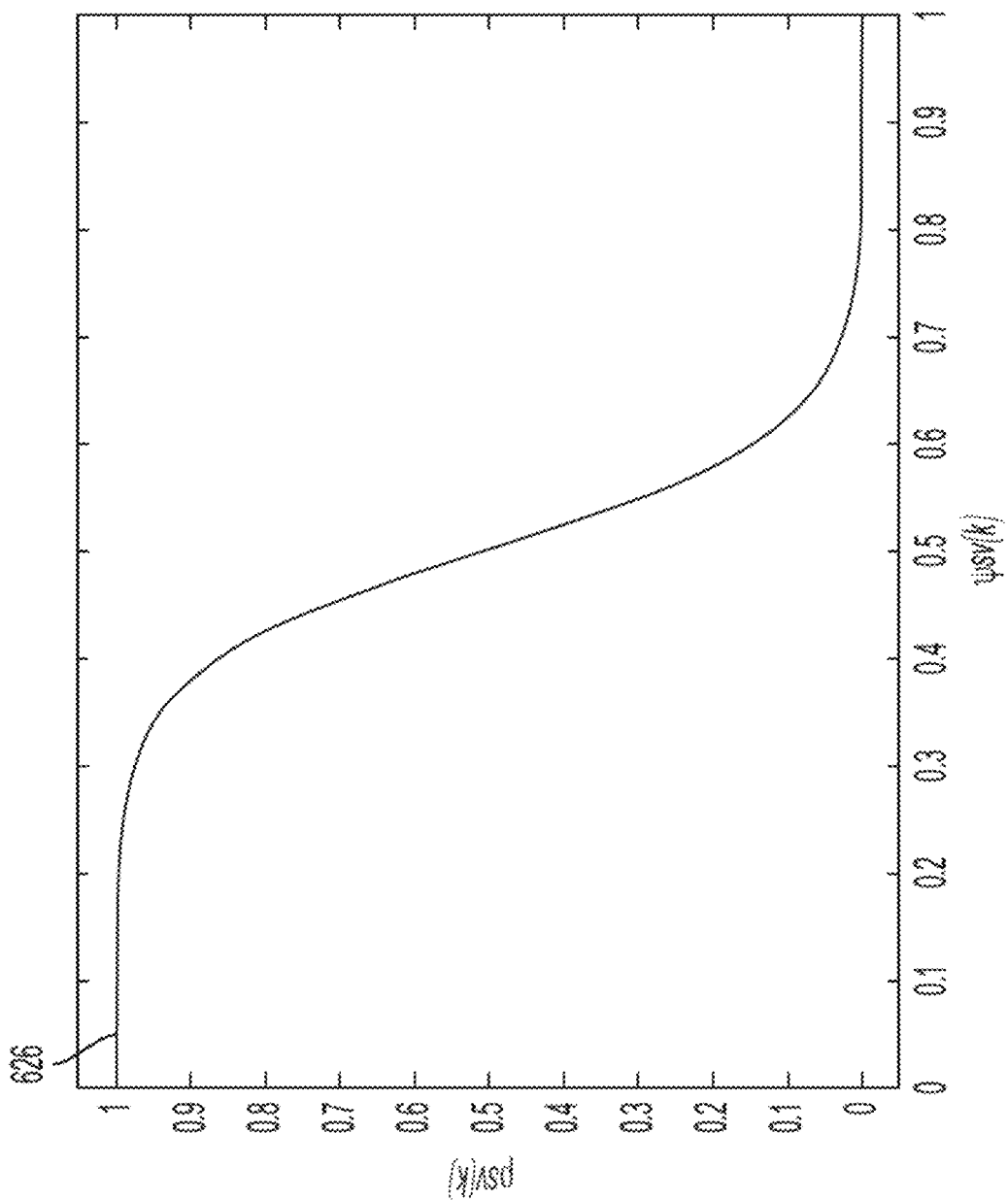

Referring back to FIG. 6A, the probability of voice activity in the single channel signal can be determined at step 612 from the ratio of the smoothed input power to the noise power estimate. In some embodiments, the presence of voice activity is determined by mapping the ratio of smoothed input power to the noise power estimate into probability space, as shown in FIG. 6C. In some embodiments, the ratio is mapped into probability space by using a function to assign a probability that a signal at any given time is voice activity based on the calculated ratio. For example, FIG. 6C depicts a logistic mapping function 626 where the x-axis is the calculated ratio at a given time of the noise power estimate to the smoothed input power, and the y-axis is the probability that the ratio at that time represents voice activity. In some embodiments, the type of function and function parameters can be tuned to minimize false positives and false negatives. The tuning process can use any suitable methods (e.g., manual, semi-automatic, and/or automatic tuning, for example, machine learning based tuning). Although a logistic function is depicted for mapping input ratios to probability of voice activity, it is contemplated that other methods for mapping input ratios into probability space can be used as well.

Referring now to FIGS. 5 and 7A-7E, FIG. 7A depicts in more detail an example of how determining a probability of voice activity from a beamforming signal step 503 can be performed. In some embodiments, the beamforming signal can be determined from two or more microphones 702 and 703 (e.g., microphones 150). In some embodiments, the two or more microphones are spaced in a known manner relative to the user's mouth. The two or more microphones can optionally be spaced in a symmetric manner relative to a speech source (e.g., a user's mouth). The depicted embodiment shows that microphones 702 and 703 provide input audio signals. However, in other embodiments, audio signals can be provided from other suitable sources as well (e.g., one or more data files or one or more network audio streams).

Figure 7A:
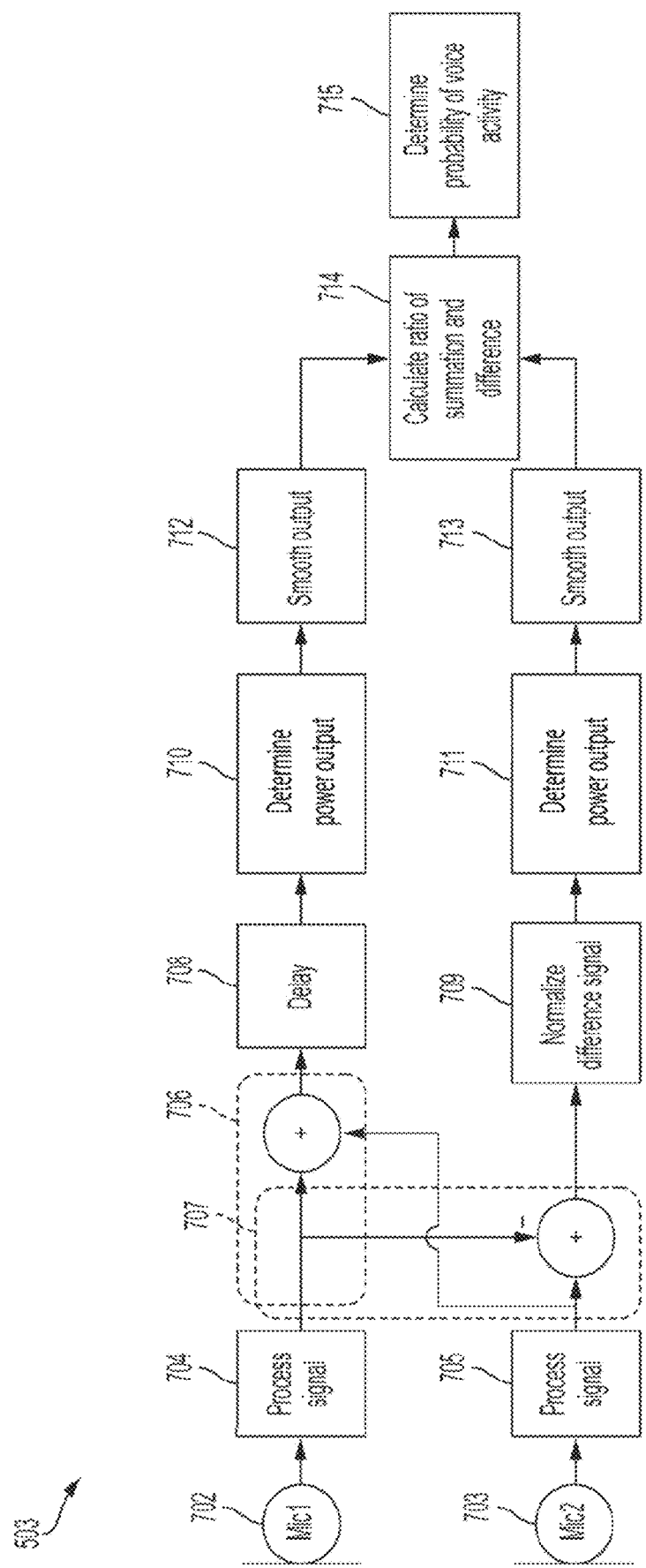
FIGS. 7A-7E illustrate examples of processing input audio signals according to some embodiments of the disclosure.
Figure 7B:
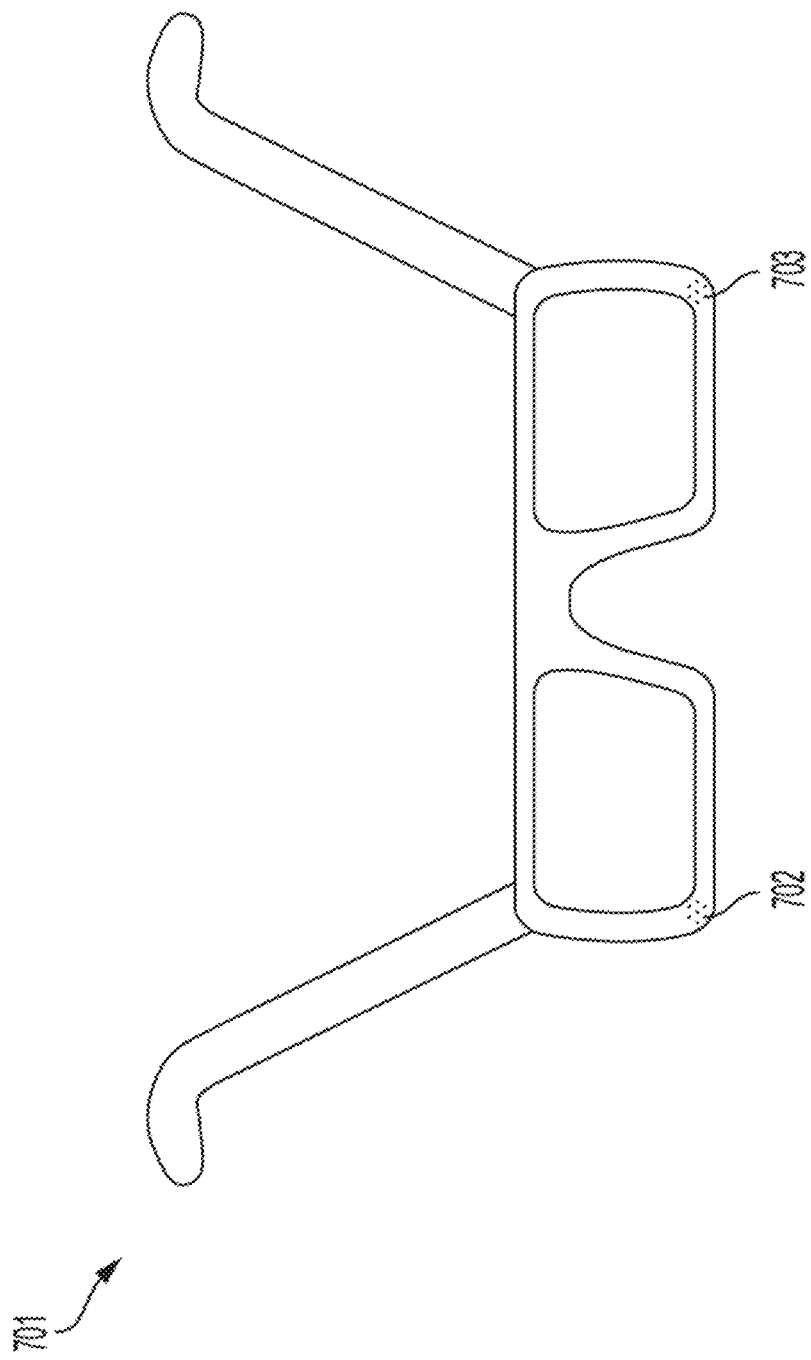

In FIG. 7B, microphones 702 and 703 are shown on an example device 701 (e.g., wearable head device) designed to be worn on a user's head. In the depicted embodiment, microphones 702 and 703 are placed in a broadside configuration with respect to the user's mouth. Microphones 702 and 703 can also be placed equidistant from the user's mouth for ease of subsequent signal processing. However, it is also contemplated that other microphone arrangements (e.g., number of microphones, placement of microphones, asymmetric microphone arrangements) can be used. For example, in some embodiments, one or more microphones can be placed outside of a device designed to be worn on a user's head. In some embodiments, one or more microphones may be placed in a room at known locations. One or more microphones placed in a room at known locations may be communicatively coupled to a wearable head device or a processor communicatively coupled to a wearable head device. In some embodiments, a position of a user in the room can be used in conjunction with known locations of one or more microphones in the room for subsequent processing or calibration.

In another example, one or more microphones can be placed in a location that is generally but not completely fixed with respect to a user. In some embodiments, one or more microphones may be placed in a car (e.g., two microphones equally spaced relative to a driver's seat). In some embodiments, one or more microphones may be communicatively coupled to a processor. In some embodiments, a generally expected location of a user may be used in conjunction with a known location of one or more microphones for subsequent processing or calibration.

Referring back to the example shown in FIG. 7A, the input audio signals can be processed in blocks 704 and 705. In some embodiments, signal processing steps 704 and 705 include applying a window function to the audio signals. A window function can be zero-valued outside of a chosen interval, and it can be useful to use window functions when the information carrying portion of a signal is in a known range (e.g., human speech). A window function can also serve to deconstruct a signal into frames that approximate a signal from a stationary process. It can be beneficial to approximate a signal from a stationary process to apply signal processing techniques suited for stationary processes (e.g., a Fourier transform). In some embodiments, a Hann window can be used, with a frame overlapping percentage of 50%. However, it is contemplated that other window functions with different frame overlapping percentages and/or hop sizes can be used as well. In some embodiments, the audio signals can also be filtered at steps 704 and 705. Filtering can occur inside or outside the frequency domain to suppress parts of a signal that do not carry information (e.g., parts of a signal that do not carry human speech). In some embodiments, a bandpass filter can be applied to reduce noise in non-voice frequency bands. In some embodiments, a FIR filter can be used to preserve the phase of the signals. In some embodiments, both a window function and a filter are applied to the audio signals at steps 704 and 705. In some embodiments, a window function can be applied before a filter function is applied to an audio signal. However, it is also contemplated that one of a window function or a filter are applied to the audio signals at steps 704 and/or 705, or other signal processing steps are applied at steps 704 and/or 705.

Figure 7C:
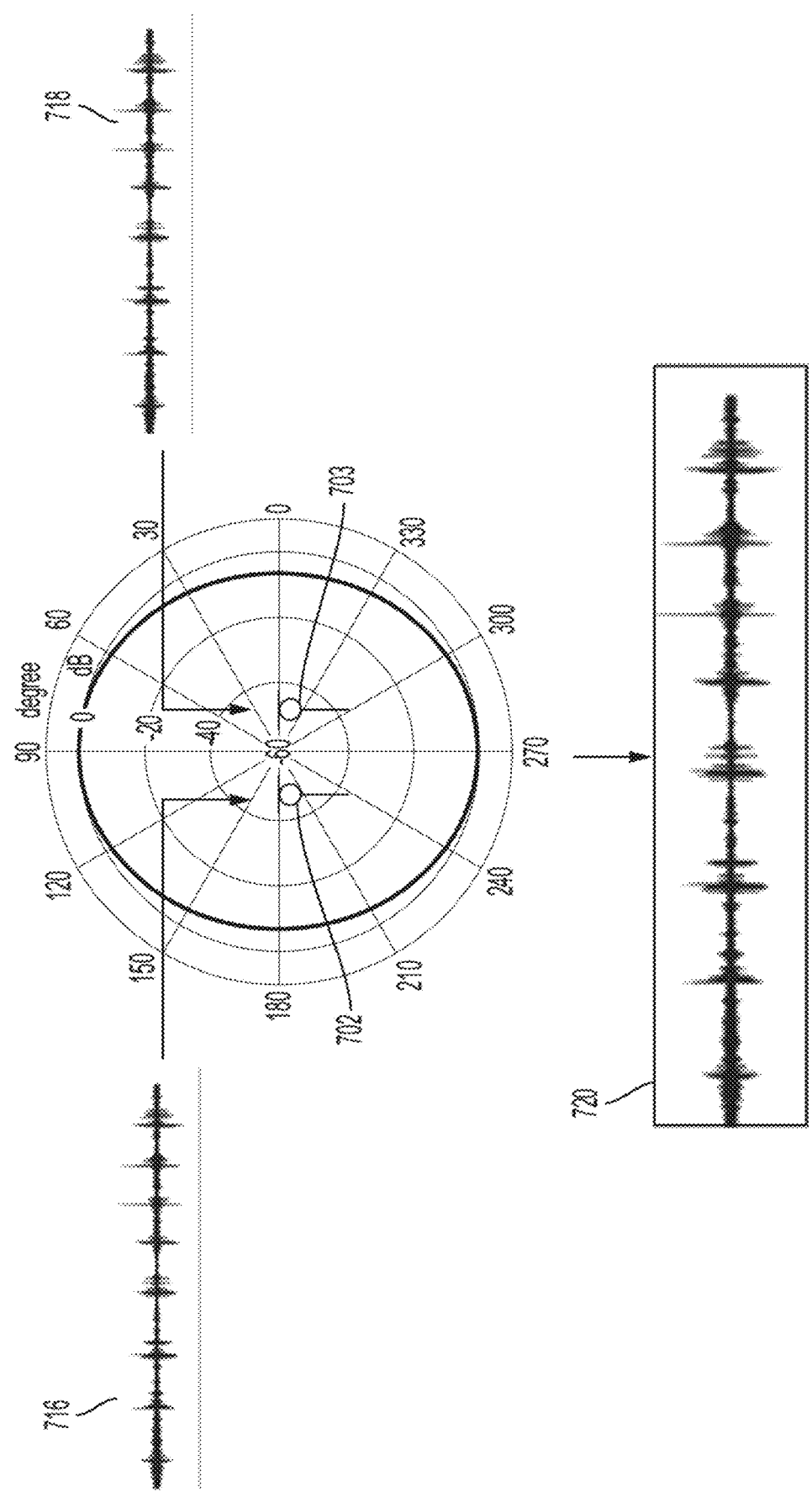

At step 706, the two or more audio signals are summed to produce a summation signal, as shown in more detail in FIG. 7C. FIG. 7C depicts an embodiment where microphone 702 records input audio signal 716 and microphone 703 records input audio signal 718. Input audio signals 716 and 718 are then summed to produce summation signal 720. For microphone configurations that are symmetric relative to a signal source (e.g., a user's mouth), a summed input signal can serve to reinforce an information signal (e.g., a speech signal) because the information signal can be present in both input audio signals 716 and 718. In some embodiments, the noise signal in input audio signals 716 and 718 can generally not be reinforced because of the random nature of the noise signal. For microphone configurations that are not symmetric relative to a signal source, a summed signal can still serve to increase a signal-to-noise ratio (e.g., by reinforcing a speech signal without reinforcing a noise signal). In some embodiments, a filter or delay process can be used for asymmetric microphone configurations. A filter or delay process can align input audio signals to simulate a symmetric microphone configuration by compensating for a longer or shorter path from a signal source to a microphone.

Figure 7D:
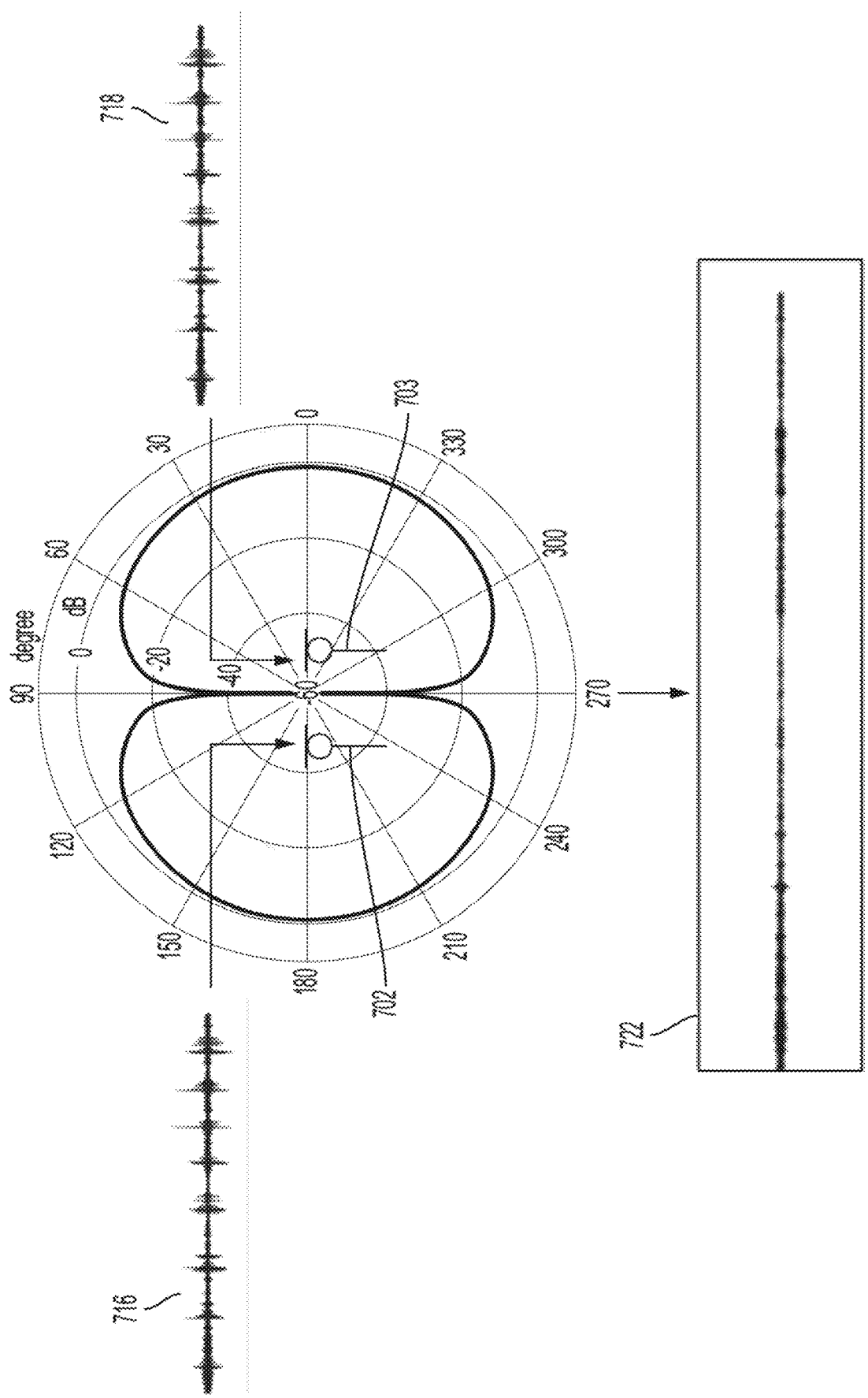

Referring back to the example shown in FIG. 7A, two or more audio signals are subtracted to produce a difference signal at step 707, as shown in more detail in FIG. 7D. FIG. 7D depicts an embodiment where the same input audio signals 716 and 718 recorded by microphones 702 and 703 are also subtracted to form a difference signal 722. For microphone configurations that are symmetric relative to a signal source, the difference signal 722 can contain a noise signal. In some embodiments, microphones 702 and 703 are located equidistant from a user's mouth in a wearable head device. Accordingly, input audio signals 716 and 718 recorded by microphones 702 and 703 receive the same speech signal at the same amplitude and at the same time when the user speaks. A difference signal 722 calculated by subtracting one of input audio signals 716 and 718 from the other would therefore generally remove the speech signal from the input audio signal, leaving the noise signal. For microphone configurations that are not symmetric relative to a signal source, a difference signal can contain a noise signal. In some embodiments, a filter or delay process can be used to simulate a symmetric microphone configuration by compensating for a longer or shorter path from a signal source to a microphone.

Referring back to the example shown in FIG. 7A, the difference signal can be normalized at step 709 in anticipation of calculating a ratio at step 714. In some embodiments, calculating the ratio of the summation signal and the normalized difference signal involves dividing the normalized difference signal by the summation signal (although the reverse order may also be used). A ratio of a summation signal and a normalized difference signal can have an improved signal-to-noise ratio as compared to either component signal. In some embodiments, calculating the ratio is simplified if the baseline noise signal is the same in both the summation signal and the difference signal. The ratio calculation can be simplified because the ratio will approximate "1" where noise occurs if the baseline noise signal is the same. However, in some embodiments, the summation signal and the difference signal will have different baseline noise signals. The summation signal, which can be calculated by summing the input audio signals received from two or more microphones, can have a baseline that is approximately double the baseline of each individual input audio signal. The difference signal, which can be calculated by subtracting the input audio signals from two or more microphones, can have a baseline that is approximately zero. Accordingly, in some embodiments, the baseline of the difference signal can be normalized to approximate the baseline of the summation signal (although the reverse is also contemplated).

In some embodiments, a baseline for a difference signal can be normalized to a baseline for a summation signal by using an equalization filter, which can be a FIR filter. A ratio of a power spectral density of a noise signal in a difference signal and a noise signal in a summation signal can be given as equation (1), where $\Gamma_{N12}(\omega)$ represents the coherence of a signal $N_1$ (which can correspond to a noise signal from a first microphone) and a signal $N_2$ (which can correspond to a noise signal from a second microphone), and where Re(*) can represent the real portion of a complex number:

$$\frac{\Phi_{diff,noise}(\omega)}{\Phi_{sum,noise}(\omega)} = \frac{1 - \text{Re}(\Gamma_{N12}(\omega))}{1 + \text{Re}(\Gamma_{N12}(\omega))} \tag{1}$$

Accordingly, a desired frequency response of an equalization filter can be represented as equation (2):

$$H_{eq}(\omega) = \sqrt{\frac{1 + \text{Re}(\Gamma_{N12}(\omega))}{1 - \text{Re}(\Gamma_{N12}(\omega))}} \tag{2}$$

Determining $\Gamma_{N12}(\omega)$ can be difficult because it can require knowledge about which segments of a signal comprise voice activity. This can present a circular issue where voice activity information is required in part to determine voice activity information. One solution can be to model a noise signal as a diffuse field sound as equation (3), where d can represent a spacing between microphones, where c can represent the speed of sound, and ω can represent a normalized frequency:

$$\Gamma_{diffuse}(\omega) = \frac{\sin\left(\frac{\omega d}{c}\right)}{\frac{\omega d}{c}} \tag{3}$$

Accordingly, a magnitude response using a diffuse field model for noise can be as equation (4):

$$H_{eq}(\omega) = \sqrt{\frac{\frac{\omega d}{c} + \sin\left(\frac{\omega d}{c}\right)}{\frac{\omega d}{c} - \sin\left(\frac{\omega d}{c}\right)}} \tag{4}$$

In some embodiments, $\Gamma_{N12}(\omega)$ can then be estimated using a FIR filter to approximate a magnitude response using a diffuse field model.

In some embodiments, input power can be estimated at steps 710 and 711. In some embodiments, input power can be determined on a per-frame basis based on a windowing function applied at steps 704 and 705. At steps 712 and 713, the summation signal and the normalized difference signal can optionally be smoothed. In some embodiments, the smoothing process occurs over the frames provided by the windowing function.

Figure 7E:
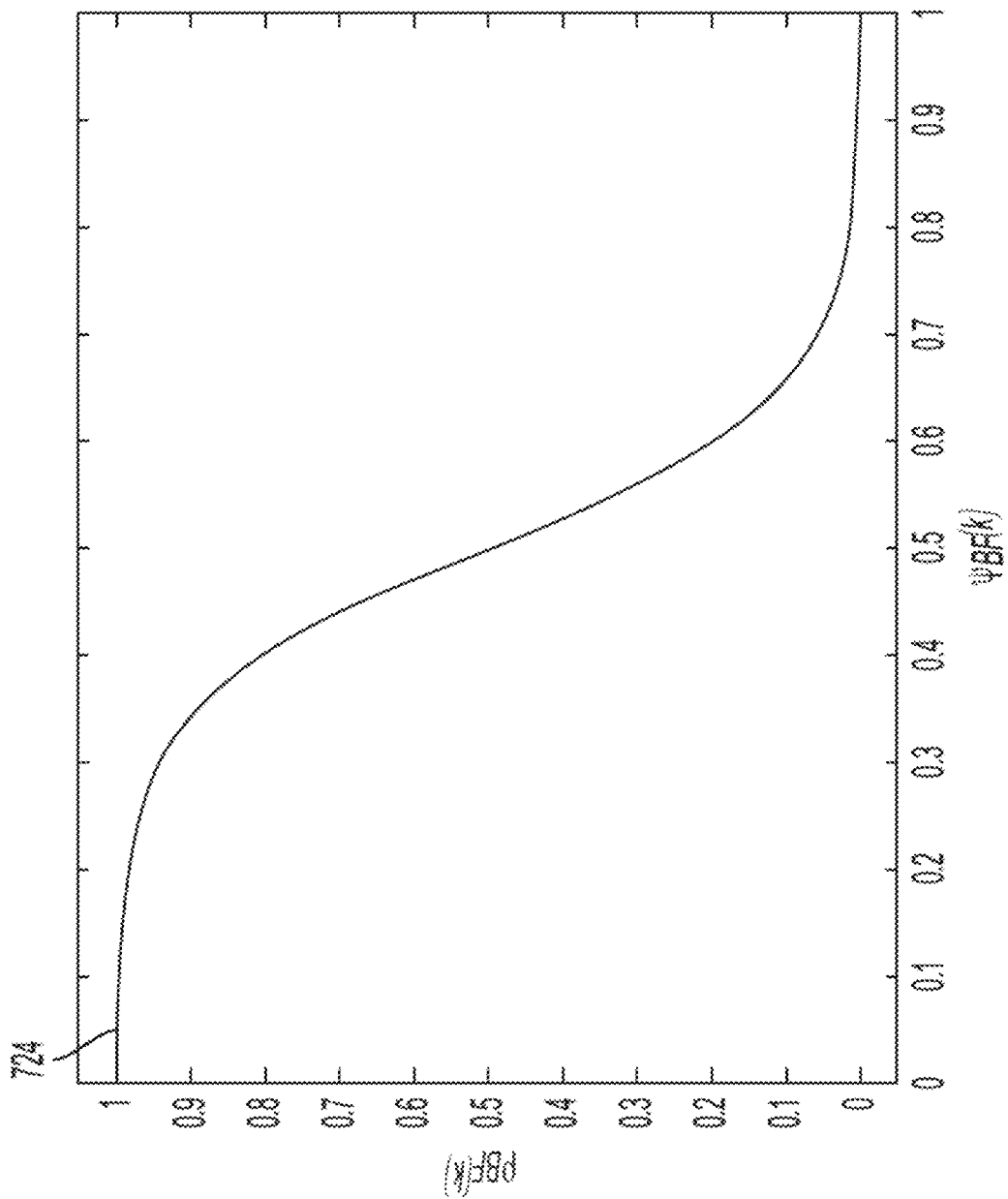

In the depicted embodiment, the probability of voice activity in the beamforming signal is determined at step 715 from the ratio of the normalized difference signal to the summation signal. In some embodiments, the presence of voice activity is determined by mapping the ratio of the normalized difference signal to the summation signal into probability space, as shown in FIG. 7E. In some embodiments, the ratio is mapped into probability space by using a function to assign a probability that a signal at any given time is voice activity based on the calculated ratio. For example, FIG. 7E depicts a logistic mapping function 724 where the x-axis is the calculated ratio at a given time of the normalized difference signal to the summation signal, and the y-axis is the probability that the ratio at that time represents voice activity. In some embodiments, the type of function and function parameters can be tuned to minimize false positives and false negatives. The tuning process can use any suitable methods (e.g., manual, semi-automatic, and/or automatic tuning, for example, machine learning based tuning). Although a logistic function is depicted for mapping input ratios to probability of voice activity, it is contemplated that other methods for mapping input ratios into probability space can be used as well.

Referring back to FIG. 5, the input signal can be classified into voice activity and non-voice activity at step 504. In some embodiments, a single combined probability of voice activity at a given time is determined from the probability of voice activity in the single channel signal and the probability of voice activity in the beamforming signal. In some embodiments, the probability from the single channel signal and from the beamforming signal can be separately weighted during the combination process. In some embodiments, the combined probability can be determined according to equation (5), where $\psi_{VAD}(l)$ represents the combined probability, $p_{BF}(l)$ represents the probability of voice activity from the beamforming signal, $p_{OD}(l)$ represents the probability of voice activity from the single channel signal, and $\alpha_{BF}$ and $\alpha_{OD}$ represent the weighting exponents for $p_{BF}(l)$ and $p_{OD}(l)$, respectively:

$$\psi_{VAD}(l) = p_{BF}(l)^{\alpha BF} \cdot p_{OD}(l)^{\alpha OD} \quad (5)$$

Based on the combined probability for a given time, the input signal can then be classified in some embodiments as voice activity or non-voice activity as equation (6), where $\delta_{VAD}$ represents a threshold:

$$VAD(l) = \begin{cases} 1: \psi_{VAD}(l) > \delta_{VAD}(\text{speech}) \\ 0: \text{otherwise(non-speech)} \end{cases} \quad (6)$$

In some embodiments, $\delta_{VAD}$ is a tunable parameter that can be tuned by any suitable means (e.g., manually, semi-automatically, and/or automatically, for example, through machine learning). The binary classification of the input signal into voice activity or non-voice activity can be the voice activity detection (VAD) output.

Voice Onset Detection

Referring back to FIG. 5, voice onset detection can be determined from the VAD output at steps 506-510. In some embodiments, the VAD output is monitored to determine a threshold amount of voice activity within a given time at step 506. In some embodiments, if the VAD output does not contain a threshold amount of voice activity within a given time, the VAD output continues to be monitored. In some embodiments, if the VAD output does contain a threshold amount of voice activity within a given time, an onset can be determined at step 510. In some embodiments, an input audio signal can be classified as voice activity or non-voice activity on a per hop-size or on a per frame basis. For example, each hop or each frame of an input audio signal can be classified as voice activity or non-voice activity. In some embodiments, onset detection can be based on a threshold number of hops or frames classified as voice activity within a threshold amount of time. However, voice activity can be classified using other means as well (e.g., on a per sample basis).

FIG. 8 depicts an embodiment of determining an onset marker 802. In some embodiments, onset marker 802 is determined from the VAD output signal 804, which is determined from the input audio signal 806. In some embodiments, the onset marker 802 is determined based on one or more tunable parameters. In some embodiments, the $T_{LOOKBACK}$ parameter can function as a buffer window through which the VAD output 804 and/or the input audio signal 806 is evaluated. In some embodiments, the $T_{LOOKBACK}$ buffer window can progress through the VAD output 804 and/or the audio signal 806 in the time domain and evaluate the amount of voice activity detected within the $T_{LOOKBACK}$ buffer window. In some embodiments, if the amount of voice activity detected within the $T_{LOOKBACK}$ buffer window exceeds a threshold parameter $T_{VA\_ACCUM}$, the system can determine an onset marker 802 at that time. In some embodiments, a larger $T_{LOOKBACK}$ value decreases the likelihood of detecting a false onset for short term noise at the expense of increasing latency. In some embodiments, $T_{VA\_ACCUM}$ should be less than or equal to the $T_{LOOKBACK}$ buffer window size.

Figure 9:
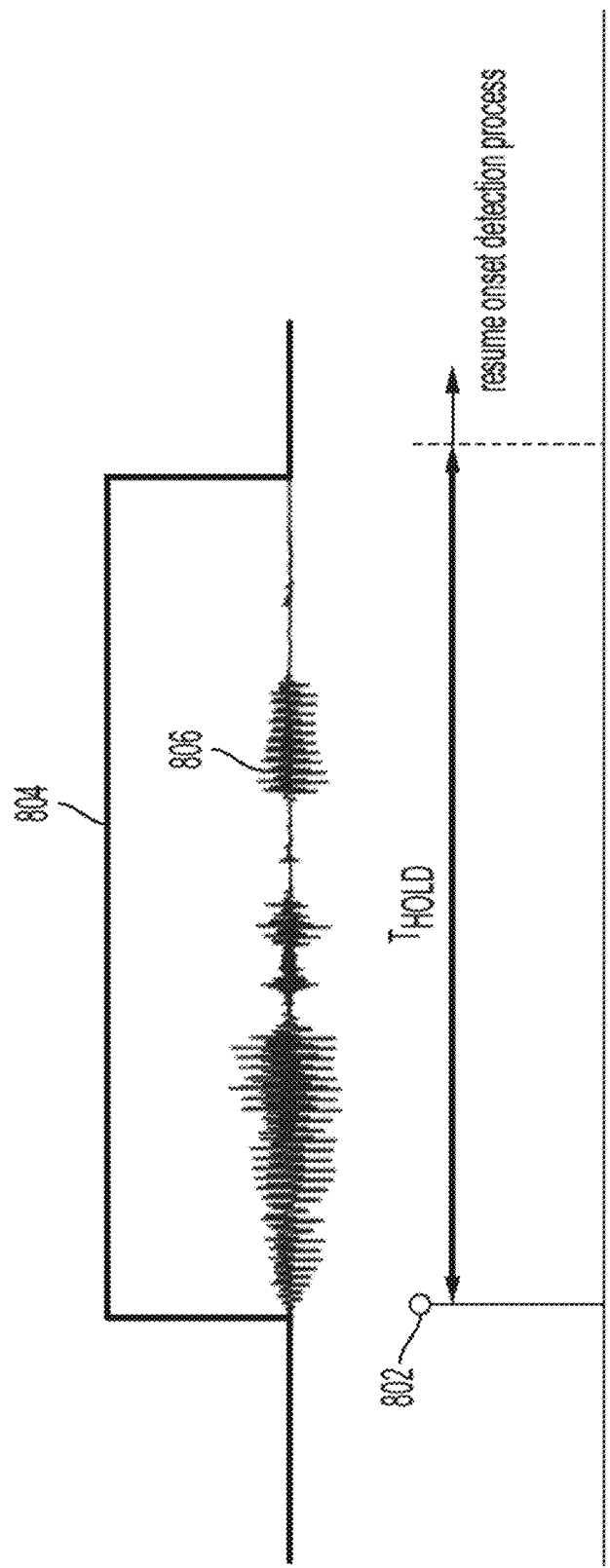
FIG. 9 illustrates an example of determining an onset of voice activity according to some embodiments of the disclosure.

FIG. 9 depicts the operation of a $T_{HOLD}$ parameter. It can be desirable to determine no more than one onset for a single utterance. For example, if a wake-up word is determined to typically be no longer than 200 milliseconds, it can be desirable to not determine a second onset within 200 milliseconds of determining a first onset. Determining multiple onsets for a single utterance can result in unnecessary processing and power consumption. In some embodiments, $T_{HOLD}$ is a duration of time during which a second onset marker should not be determined after a first onset marker has been determined. In the depicted embodiment, onset marker 802 is determined based on VAD output 804 and/or input audio signal 806. In some embodiments, after onset marker 802 is determined, another onset marker may not be determined for the duration of $T_{HOLD}$. In some embodiments, after the duration of $T_{HOLD}$ has passed, another onset marker may be determined if the proper conditions are met (e.g., the amount of voice activity detected within the $T_{LOOKBACK}$ buffer window exceeds a threshold parameter $T_{VA\_ACCUM}$). $T_{HOLD}$ can take any suitable form, like a static value or a dynamic value (e.g., $T_{HOLD}$ can be a function of the wake-up word length).

In some embodiments, an onset can be determined using parameters that can be tuned via any suitable means (e.g., manually, semi-automatically, and/or automatically, for example, through machine learning). For example, parameters can be tuned such that the voice onset detection system is sensitive to particular speech signals (e.g., a wake-up word). In some embodiments, a typical duration of a wake-up word is known (or can be determined for or by a user) and the voice onset detection parameters can be tuned accordingly (e.g., the $T_{HOLD}$ parameter can be set to approximately the typical duration of the wake-up word) and, in some embodiments, may include padding. Although the embodiments discussed assume the unit of utterance to be detected by the voice onset detection system is a word (or one or more words), it is also contemplated that the target unit of utterance can be other suitable units, such as phonemes or phrases. In some embodiments, the $T_{LOOKBACK}$ buffer window can be tuned to optimize for lag and accuracy. In some embodiments, the $T_{LOOKBACK}$ buffer window can be tuned for or by a user. For example, a longer $T_{LOOKBACK}$ buffer window can increase the system's sensitivity to onsets because the system can evaluate a larger window where the $T_{VA\_ACCUM}$ threshold can be met. However, in some embodiments, a longer $T_{LOOKBACK}$ window can increase lag because the system may have to wait longer to determine if an onset has occurred.

In some embodiments, the $T_{LOOKBACK}$ buffer window size and the $T_{VA\_ACCUM}$ threshold can be tuned to yield the least amount of false negatives and/or false positives. For example, a longer buffer window size with the same threshold can make the system less likely to produce false negatives but more likely to produce false positives. In some embodiments, a larger threshold with the same buffer window size can make the system less likely to produce false positives but more likely to produce false negatives. In some embodiments, the onset marker can be determined at the moment the $T_{VA\_ACCUM}$ threshold is met. Accordingly, in some embodiments, the onset marker can be offset from the beginning of the detected voice activity by the duration $T_{VA\_ACCUM}$. In some embodiments, it is desirable to introduce an offset to remove undesired speech signals that can precede desired speech signals (e.g., "uh" or "um" preceding a command). In some embodiments, once the $T_{VA\_ACCUM}$ threshold is met, the onset marker can be "back-dated" using suitable methods to the beginning of the detected voice activity such that there may be no offset. For example, the onset marker can be back-dated to the most recent beginning of detected voice activity. In some embodiments, the onset marker can be back-dated using one or more of onset detection parameters (e.g., $T_{LOOKBACK}$ and $T_{VA\_ACCUM}$).

In some embodiments, onset detection parameters can be determined at least in part based on previous interactions. For example, the $T_{HOLD}$ duration can be adjusted based on a determination of how long the user has previously taken to speak the wake-up word. In some embodiments, $T_{LOOKBACK}$ or $T_{VA\_ACCUM}$ can be adjusted based on a likelihood of false positives or false negatives from a user or a user's environment. In some embodiments, signal processing steps 604 (in FIG. 6A), 704 (in FIG. 7A), and 705 (in FIG. 7A) can be determined at least in part based on previous interactions. For example, parameters for a windowing function or a filtering function can be adjusted according to a user's typical voice frequencies. In some embodiments, a device can be pre-loaded with a set of default parameters which can adjust based on a specific user's interactions with a device.

In some embodiments, voice onset detection can be used to trigger subsequent events. For example, the voice onset detection system can run on an always-on, lower-power processor (e.g., a dedicated processor or a DSP), compared to a main processor. In some embodiments, the detection of an onset can wake a neighboring processor and prompt the neighboring processor to begin speech recognition. In some embodiments, the voice onset detection system can pass information to subsequent systems (e.g., the voice onset detection system can pass a timestamp of a detected onset to a speech processing engine running on a neighboring processor). In some embodiments, the voice onset detection system can use voice activity detection information to accurately determine the onset of speech without the aid of a speech processing engine. In some embodiments, the detection of an onset can serve as a trigger for a speech processing engine to activate; the speech processing engine therefore can remain inactive (reducing power consumption) until an onset has been detected. In some embodiments, a voice onset detector requires less processing (and therefore less power) than a speech processing engine because a voice onset detector analyzes input signal energy, instead of analyzing the content of the speech.

In some embodiments, sensors on a wearable head device can determine (at least in part) parameters for onset detection. For example, one or more sensors on a wearable head device may monitor a user's mouth movements in determining an onset event. In some embodiments, a user moving his or her mouth may indicate that an onset event is likely to occur. In some embodiments, one or more sensors on a wearable head device may monitor a user's eye movements in determining an onset event. For example, certain eye movements or patterns may be associated with preceding an onset event. In some embodiments, sensors on a wearable head device may monitor a user's vital signs to determine an onset event. For example, an elevated heartrate may be associated with preceding an onset event. It is also contemplated that sensors on a wearable head device may monitor a user's behavior in ways other than those described herein (e.g., head movement, hand movement).

In some embodiments, sensor data (e.g., mouth movement data, eye movement data, vital sign data) can be used as an additional parameter to determine an onset event (e.g., determination of whether a threshold of voice activity is met), or sensor data can be used exclusively to determine an onset event. In some embodiments, sensor data can be used to adjust other onset detection parameters. For example, mouth movement data can be used to determine how long a particular user takes to speak a wake-up word. In some embodiments, mouth movement data can be used to adjust a $T_{HOLD}$ parameter accordingly. In some embodiments, a wearable head device with one or more sensors can be pre-loaded with instructions on how to utilize sensor data for determining an onset event. In some embodiments, a wearable head device with one or more sensors can also learn how to utilize sensor data for predetermining an onset event based on previous interactions. For example, it may be determined that, for a particular user, heartrate data is not meaningfully correlated with an onset event, but eye patterns are meaningfully correlated with an onset event. Heartrate data may therefore not be used to determine onset events, or a lower weight may be assigned to heartrate data. A higher weight may also be assigned to eye pattern data.

In some embodiments, the voice onset detection system functions as a wrapper around the voice activity detection system. In some embodiments, it is desirable to produce onset information because onset information may be more accurate than voice activity information. For example, onset information may be more robust against false positives than voice activity information (e.g., if a speaker briefly pauses during a single utterance, voice activity detection may show two instances of voice activity when one onset is desired). In some embodiments, it is desirable to produce onset information because it requires less processing in subsequent steps than voice activity information. For example, clusters of multiple detected voice activity may require further determination if the cluster should be treated as a single instance of voice activity or multiple.

Asymmetrical Microphone Placement

Symmetrical microphone configurations (such as the configuration shown in FIG. 7B) can offer several advantages in detecting voice onset events. Because a symmetrical microphone configuration may place two or more microphones equidistant from a sound source (e.g., a user's mouth), audio signals received from each microphone may be easily added and/or subtracted from each other for signal processing. For example, because the audio signals corresponding to a user speaking may be received by microphones 702 and 703 at the same time, the audio signals (e.g., the audio signal at microphone 702 and the audio signal at microphone 703) may begin at the same time, and offsets of the audio signals may be unnecessary to combine or subtract the signals.

Figure 10:
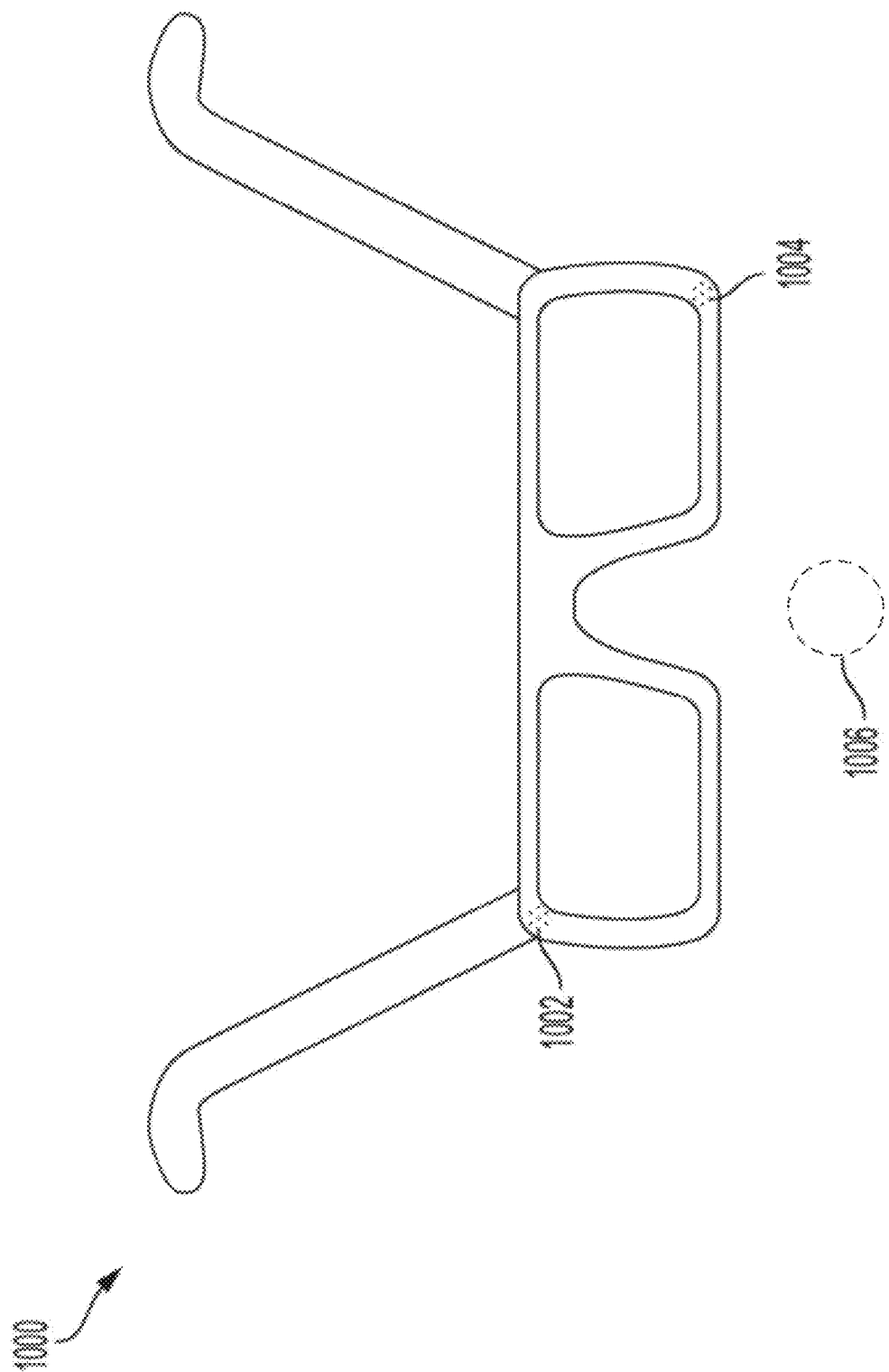
FIG. 10 illustrates an example mixed reality (MR) system, according to some embodiments of the disclosure.

In some embodiments, asymmetrical microphone configurations may be used because an asymmetrical configuration may be better suited at distinguishing a user's voice from other audio signals. In FIG. 10, a mixed reality (MR) system 1000 (which may correspond to wearable device 100 or system 400) can be configured to receive voice input from a user. In some embodiments, a first microphone may be placed at location 1002, and a second microphone may be placed at location 1004. In some embodiments, MR system 1000 can include a wearable head device, and a user's mouth may be positioned at location 1006. Sound originating from the user's mouth at location 1006 may take longer to reach microphone location 1002 than microphone location 1004 because of the larger travel distance between location 1006 and location 1002 than between location 1006 and location 1004.

In some embodiments, an asymmetrical microphone configuration (e.g., the microphone configuration shown in FIG. 10) may allow a MR system to more accurately distinguish a user's voice from other audio signals. For example, a person standing directly in front of a user may not be distinguishable from the user with a symmetrical microphone configuration on a wearable head device. A symmetrical microphone configuration (e.g., the configuration shown in FIG. 7B) may result in both microphones (e.g., microphones 702 and 703) receiving speech signals at the same time, regardless of whether the user was speaking or if the person directly in front of the user is speaking. This may allow the person directly in front of the user to "hijack" a MR system by issuing voice commands that the MR system may not be able to determine as originating from someone other than the user. In some embodiments, an asymmetrical microphone configuration may more accurately distinguish a user's voice from other audio signals. For example, microphones placed at locations 1002 and 1004 may receive audio signals from the user's mouth at different times, and the difference may be determined by the spacing between locations 1002/1004 and location 1006. However, microphones at locations 1002 and 1004 may receive audio signals from a person speaking directly in front of a user at the same time. The user's speech may therefore be distinguishable from other sound sources (e.g., another person) because the user's mouth may be at a lower height than microphone locations 1002 and 1004, which can be determined from a sound delay at position 1002 as compared to position 1004.

Although asymmetrical microphone configurations may provide additional information about a sound source (e.g., an approximate height of the sound source), a sound delay may complicate subsequent calculations. In some embodiments, adding and/or subtracting audio signals that are offset (e.g., in time) from each other may decrease a signal-to-noise ratio ("SNR"), rather than increasing the SNR (which may happen when the audio signals are not offset from each other). It can therefore be desirable to process audio signals received from an asymmetrical microphone configuration such that a beamforming analysis (e.g., noise cancellation) may still be performed to determine voice activity. In some embodiments, a voice onset event can be determined based on a beamforming analysis and/or single channel analysis. A notification may be transmitted to a processor (e.g., a DSP or x86 processor) in response to determining that a voice onset event has occurred. The notification may include information such as a timestamp of the voice onset event and/or a request that the processor begin speech recognition.

Figure 11A:
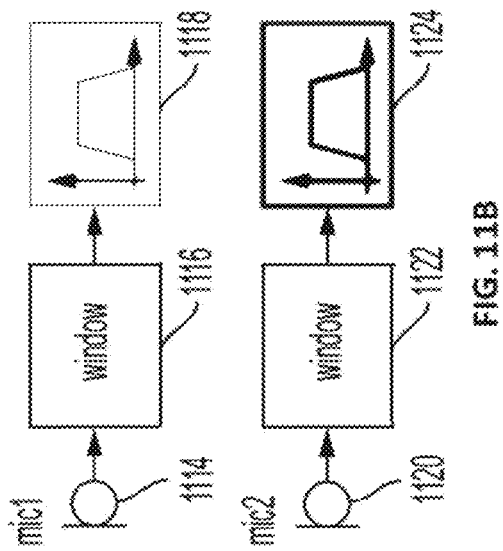
FIGS. 11A-11C illustrate example signal processing steps, according to some embodiments of the disclosure.
Figure 11B:
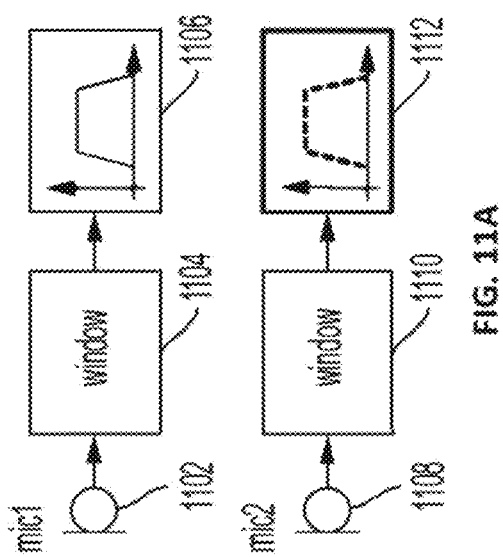
Figure 11C:
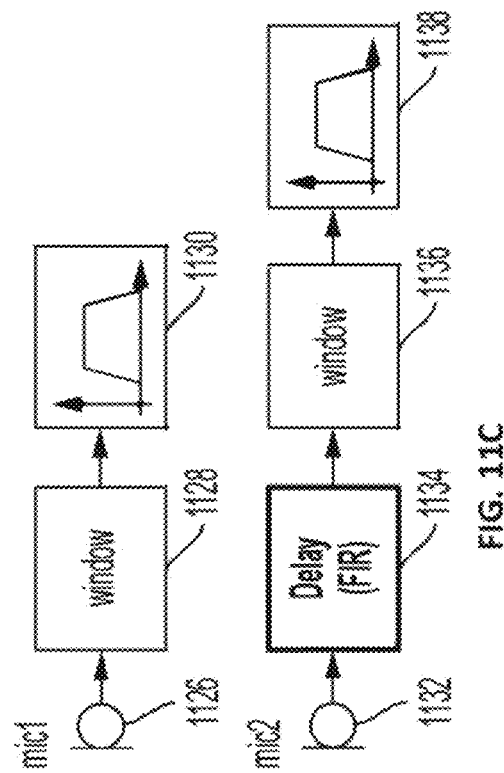

FIGS. 11A-11C illustrate examples of processing audio signals. In some embodiments, FIGS. 11A-11C illustrate example embodiments of processing audio signals such that a beamforming voice activity detection analysis can be performed on audio signals that may be offset (e.g., in time) from each other (e.g., due to an asymmetric microphone configuration).

FIG. 11A illustrates an example of implementing a time-offset in a bandpass filter. In some embodiments, an audio signal received at microphone 1102 may be processed at steps 1104 and/or 1106. In some embodiments, steps 1104 and 1106 together may correspond to processing step 704 and/or step 603. For example, microphone 1102 may be placed at position 1004. In some embodiments, a window function may be applied at step 1104 to a first audio signal (e.g., an audio signal corresponding to a user's voice) received by microphone 1102. In some embodiments, a first filter (e.g., a bandpass filter) may be applied to the first audio signal at step 1106.

In some embodiments, an audio signal received at microphone 1108 may be processed at steps 1110 and/or 1112. In some embodiments, steps 1110 and 1112 together may correspond to processing step 705 and/or step 604. For example, microphone 1108 may be placed at position 1002. In some embodiments, a window function may be applied at step 1110 to a second audio signal received by microphone 1108. In some embodiments, the window function applied at step 1110 can be the same window function applied at step 1104. In some embodiments, a second filter (e.g., a bandpass filter) may be applied to the second audio signal at step 1112. In some embodiments, the second filter may be different from the first filter because the second filter may account for a time-delay between an audio signal received at microphone 1108 and an audio signal received at microphone 1102. For example, a user may speak while wearing MR system 1000, and the user's voice may be picked up by microphone 1108 at a later time than by microphone 1102 (e.g., because microphone 1108 may be further away from a user's mouth than microphone 1102). In some embodiments, a bandpass filter applied at step 1112 can be implemented in the time domain, and the bandpass filter can be shifted (as compared to a bandpass filter applied at step 1106) by a delay time, which may include an additional time for sound to travel from position 1006 to 1002, as compared from 1006 to 1004. In some embodiments, a delay time may be approximately 3-4 samples at a 48 kHz sampling rate, although a delay time can vary depending on a particular microphone (and user) configuration. A delay time can be predetermined (e.g., using measuring equipment) and may be fixed across different MR systems (e.g., because the microphone configurations may not vary across different systems). In some embodiments, a delay time can be dynamically measured locally by individual MR systems. For example, a user may be prompted to generate an impulse (e.g., a sharp, short noise) with their mouth, and a delay time may be recorded as the impulse reaches asymmetrically positioned microphones. In some embodiments, a bandpass filter can be implemented in the frequency domain, and one or more delay times may be applied to different frequency domains (e.g., a frequency domain including human voices may be delayed by a first delay time, and all other frequency domains may be delayed by a second delay time).

FIG. 11B illustrates an example of implementing two filters. In some embodiments, an audio signal received at microphone 1114 may be processed at steps 1116 and/or 1118. In some embodiments, steps 1116 and 1118 together may correspond to processing step 704 and/or step 603. For example, microphone 1114 may be placed at position 1004. In some embodiments, a window function may be applied at step 1116 to a first audio signal (e.g., an audio signal corresponding to a user's voice) received by microphone 1114. In some embodiments, a first filter (e.g., a bandpass filter) may be applied to the first audio signal at step 1118. In some embodiments, a bandpass filter applied at step 1118 can have a lower tap than a bandpass filter applied at step 1106 (e.g., the tap may be half of a tap used at step 1106). A lower tap may result in a lower memory and/or computation cost, but may yield a lower fidelity audio signal.

In some embodiments, an audio signal received at microphone 1120 may be processed at steps 1122 and/or 1124. In some embodiments, steps 1122 and 1124 together may correspond to processing step 705 and/or step 604. For example, microphone 1120 may be placed at position 1002. In some embodiments, a window function may be applied at step 1122 to a second audio signal received by microphone 1120. In some embodiments, the window function applied at step 1122 can be the same window function applied at step 1116. In some embodiments, a second filter (e.g., a bandpass filter) may be applied to the second audio signal at step 1124. In some embodiments, the second filter may be different from the first filter because the second filter may account for a time-delay between an audio signal received at microphone 1120 and an audio signal received at microphone 1114. In some embodiments, the second filter may have the same tap as the filter applied at step 1118. In some embodiments, the second filter may be configured to account for additional variations. For example, an audio signal originating from a user's mouth may be distorted as a result of, for example, additional travel time, reflections from additional material traversed (e.g., parts of MR system 1000), reverberations from additional material traversed, and/or occlusion from parts of MR system 1000. In some embodiments, the second filter may be configured to remove and/or mitigate distortions that may result from an asymmetrical microphone configuration.

FIG. 11C illustrates an example of implementing an additional FIR filter. In some embodiments, an audio signal received at microphone 1126 may be processed at steps 1128 and/or 1130. In some embodiments, steps 1128 and 1130 together may correspond to processing step 704 and/or step 603. For example, microphone 1126 may be placed at position 1004. In some embodiments, a window function may be applied at step 1128 to a first audio signal (e.g., an audio signal corresponding to a user's voice) received by microphone 1126. In some embodiments, a first filter (e.g., a bandpass filter) may be applied to the first audio signal at step 1130.

In some embodiments, an audio signal received at microphone 1132 may be processed at steps 1134, 1136, and/or 1138. In some embodiments, steps 1134, 1136, and 1138 together may correspond to processing step 705 and/or step 604. For example, microphone 1132 may be placed at position 1002. In some embodiments, a FIR filter can be applied to a second audio signal received by microphone 1132. In some embodiments, a FIR filter can be configured to filter out non-impulse responses. An impulse response can be pre-determined (and may not vary across MR systems with the same microphone configurations), or an impulse response can be dynamically determined at individual MR systems (e.g., by having the user utter an impulse and recording the response). In some embodiments, a FIR filter can provide better control of designing a frequency-dependent delay than an impulse response filter. In some embodiments, a FIR filter can guarantee a stable output. In some embodiments, a FIR filter can be configured to compensate for a time delay. In some embodiments, a FIR filter can be configured to remove distortions that may result from a longer and/or different travel path for an audio signal. In some embodiments, a window function may be applied at step 1136 to a second audio signal received by microphone 1132. In some embodiments, the window function applied at step 1136 can be the same window function applied at step 1128. In some embodiments, a second filter (e.g., a bandpass filter) may be applied to the second audio signal at step 1138. In some embodiments, the second filter may be the same as the filter applied at step 1130.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to one or more microphones) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech processing engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
   receiving, via a first microphone, a first audio signal;
   determining a first probability of voice activity based on the first audio signal;

receiving, via a second microphone, a second audio signal;
combining the first audio signal and the second audio signal to produce a third audio signal, the third audio signal comprising a beamforming signal;
determining a second probability of voice activity based on the third audio signal;
determining whether a first threshold of voice activity is met based on the first probability of voice activity and the second probability of voice activity;
in accordance with a determination that the first threshold of voice activity is met:
  determining that a voice onset has occurred; and
  transmitting an alert to a processor based on the determination that the voice onset has occurred; and
in accordance with a determination that the first threshold of voice activity is not met, forgoing determining that a voice onset has occurred.

2. The method of claim 1, wherein determining whether the first threshold of voice activity is met comprises:
determining a baseline noise power; and
determining a ratio of the first audio signal to the baseline noise power.

3. The method of claim 1, wherein determining the second probability of voice activity based on the first audio signal and the second audio signal comprises:
summing the first audio signal and the second audio signal to produce a summation signal;
subtracting the first audio signal and the second audio signal to produce a difference signal; and
calculating a ratio of the difference signal to the summation signal.

4. The method of claim 1, wherein the first microphone and the second microphone are configured to be equidistant from a user's mouth.

5. The method of claim 1, wherein the first microphone is configured to be a first distance from a user's mouth, and wherein the second microphone is configured to be a second distance different from the first distance from a user's mouth.

6. The method of claim 5, the method further comprising determining a time offset associated with a difference between the first distance and the second distance, wherein determining the second probability of voice activity based on the third audio signal further comprises compensating for the time offset.

7. The method of claim 6, the method further comprising:
applying a window function to the first audio signal;
applying a bandpass filter to the first audio signal;
applying a finite-impulse response (FIR) filter to the second audio signal, the FIR filter associated with the time offset compensation;
applying a window function to the second audio signal; and
applying a bandpass filter to the second audio signal.

8. The method of claim 1, wherein determining whether the first threshold of voice activity is met comprises:
weighting the first probability of voice activity with a first weight; and
weighting the second probability of voice activity with a second weight.

9. The method of claim 1, the method further comprising:
in accordance with a determination that the first threshold of voice activity is met, initiating a subsequent processing step.

10. The method of claim 9, wherein the subsequent processing step comprises determining a content of speech.

11. The method of claim 1, wherein the first microphone and the second microphone are located on a wearable head device.

12. The method of claim 1, wherein the determination of whether the first threshold of voice activity is met is based on sensor data from a wearable head device.

13. The method of claim 12, wherein the sensor data comprises mouth movement data associated with a user of the wearable head device.

14. The method of claim 12, wherein the sensor data comprises eye movement data associated with a user of the wearable head device.

15. The method of claim 12, wherein the sensor data comprises vital sign data associated with a user of the wearable head device.

16. A system comprising:
a first microphone;
a second microphone; and
one or more processors configured to perform:
  receiving, via the first microphone, a first audio signal;
  determining a first probability of voice activity based on the first audio signal;
  receiving, via the second microphone, a second audio signal;
  combining the first audio signal and the second audio signal to produce a third audio signal, the third audio signal comprising a beamforming signal;
  determining a second probability of voice activity based on the third audio signal;
  determining whether a first threshold of voice activity is met based on the first probability of voice activity and the second probability of voice activity;
  in accordance with a determination that the first threshold of voice activity is met:
    determining that a voice onset has occurred; and
    transmitting an alert to a processor of the one or more processors based on the determination that the voice onset has occurred; and
  in accordance with a determination that the first threshold of voice activity is not met, forgoing determining that a voice onset has occurred.

17. The system of claim 16, wherein the first microphone is configured to be a first distance from a user's mouth, and wherein the second microphone is configured to be a second distance different from the first distance from a user's mouth.

18. A non-transitory computer-readable medium storing one or more instructions, which, when executed by one or more processors of an electronic device, cause the device to perform a method comprising:
receiving, via a first microphone, a first audio signal;
determining a first probability of voice activity based on the first audio signal;
receiving, via a second microphone, a second audio signal;
combining the first audio signal and the second audio signal to produce a third audio signal, the third audio signal comprising a beamforming signal;
determining a second probability of voice activity based on the third audio signal;
determining whether a first threshold of voice activity is met based on the first probability of voice activity and the second probability of voice activity;
in accordance with a determination that the first threshold of voice activity is met:
  determining that a voice onset has occurred; and transmitting an alert to a processor of the one or more processors based on the determination that the voice onset has occurred; and in accordance with a determination that the first threshold of voice activity is not met, forgoing determining that a voice onset has occurred.

19. The non-transitory computer-readable medium of claim 18, wherein the first microphone is configured to be a first distance from a user's mouth, and wherein the second microphone is configured to be a second distance different from the first distance from a user's mouth.

20. The non-transitory computer-readable medium of claim 19, wherein the method further comprises determining a time offset associated with a difference between the first distance and the second distance, wherein determining the second probability of voice activity based on the third audio signal further comprises compensating for the time offset.

* * * * *